Jan. 29, 1952 R. E. BOYDEN 2,583,810
ACCUMULATOR STATE CONTROL POSITIONING MECHANISM
Filed March 13, 1945 15 Sheets-Sheet 1
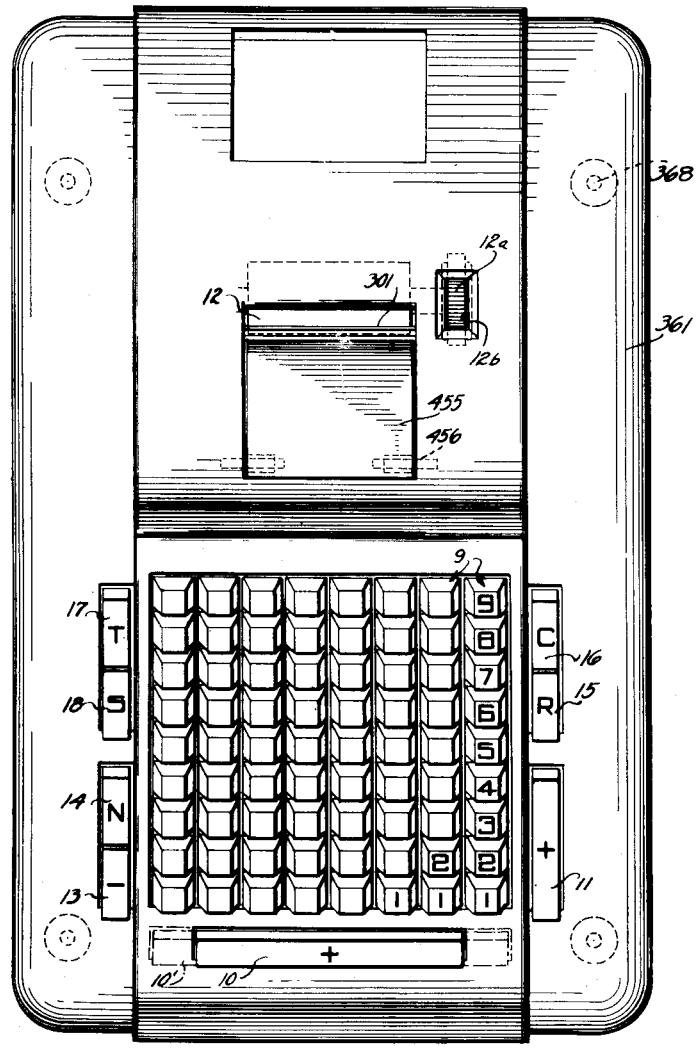
FIG_1.
INVENTOR.
ROBERT E. BOYDEN
BY
Fred N. Schwend
ATTORNEY

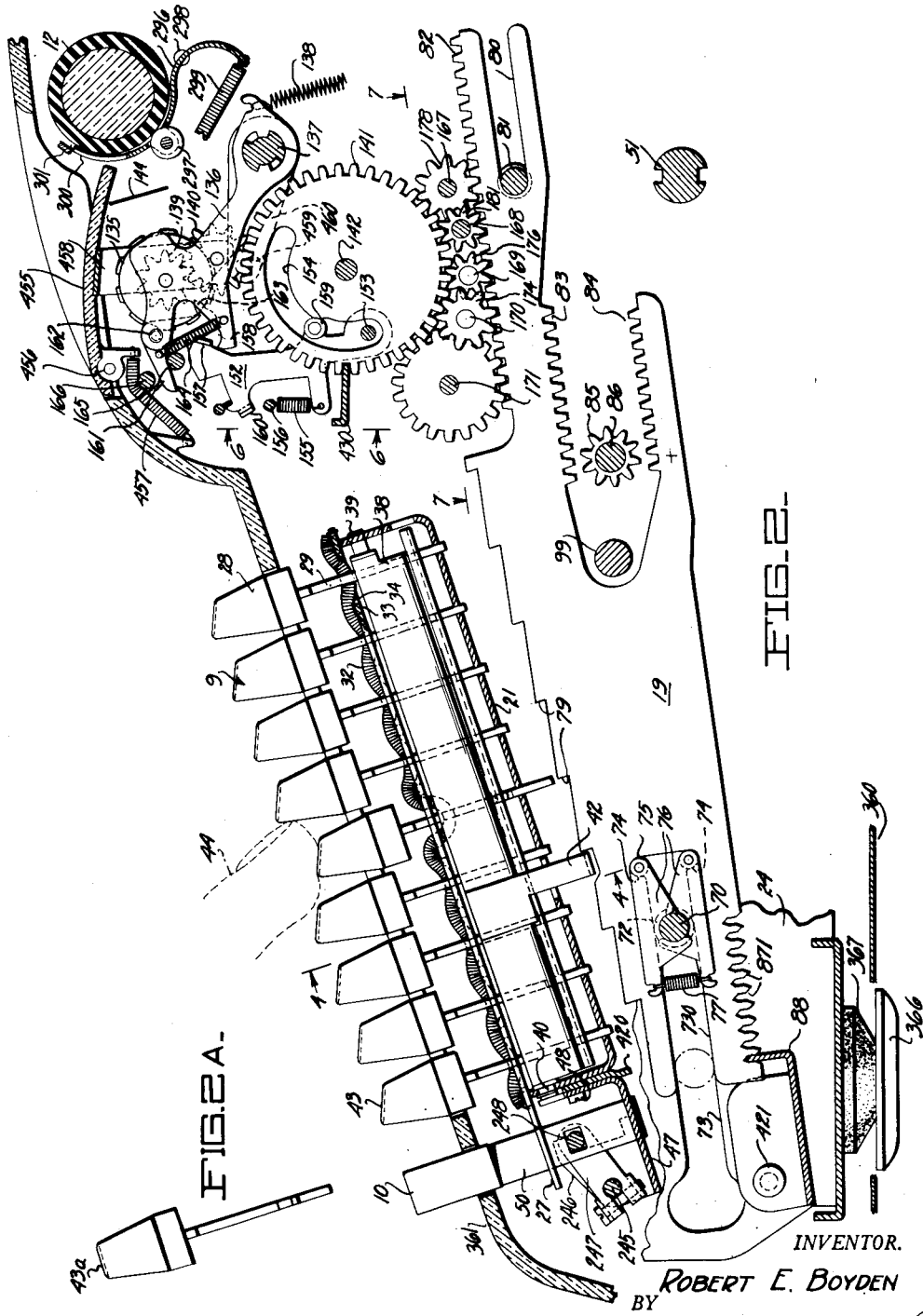

Jan. 29, 1952 R. E. BOYDEN 2,583,810
ACCUMULATOR STATE CONTROL POSITIONING MECHANISM
Filed March 13, 1945 15 Sheets-Sheet 3
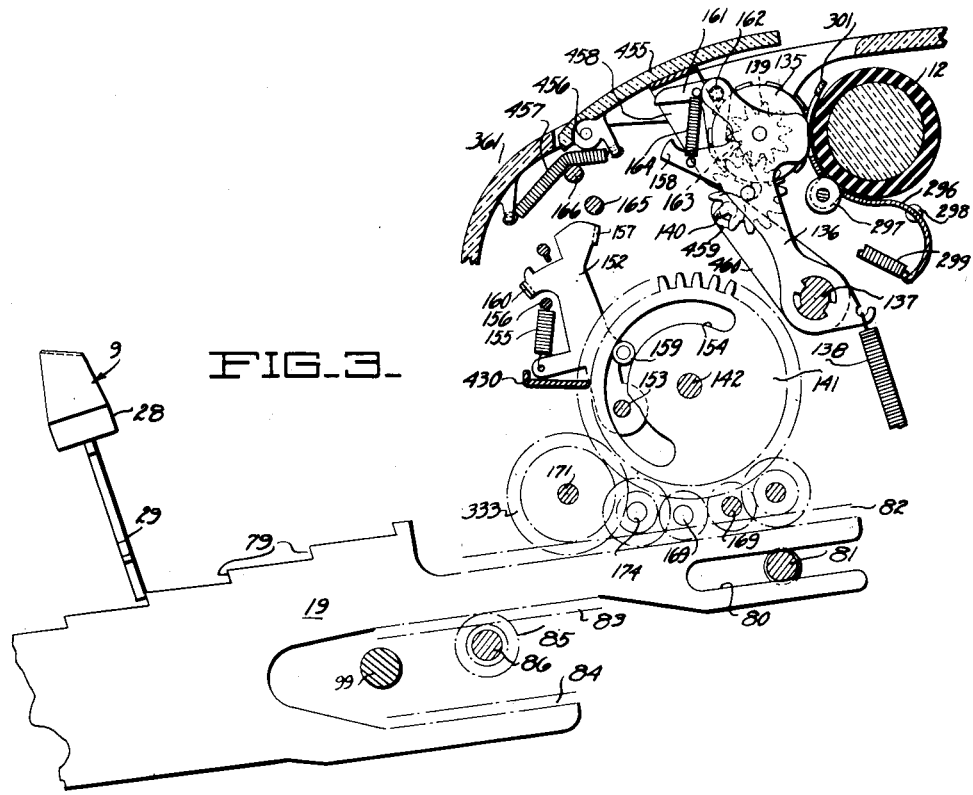
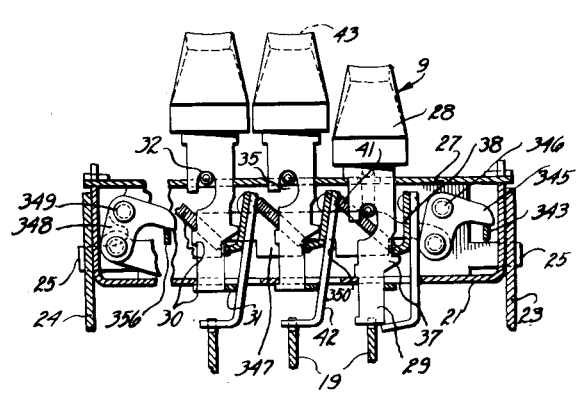
INVENTOR.
ROBERT E. BOYDEN
BY
ATTORNEY Jan. 29, 1952 R. E. BOYDEN 2,583,810
ACCUMULATOR STATE CONTROL POSITIONING MECHANISM
Filed March 13, 1945 15 Sheets-Sheet 4

INVENTOR.
ROBERT E. BOYDEN
BY
ATTORNEY

Jan. 29, 1952 R. E. BOYDEN 2,583,810
ACCUMULATOR STATE CONTROL POSITIONING MECHANISM
Filed March 13, 1945 15 Sheets-Sheet 5

INVENTOR.
ROBERT E. BOYDEN
BY
Fred N. Schwend
ATTORNEY

Jan. 29, 1952 R. E. BOYDEN 2,583,810
ACCUMULATOR STATE CONTROL POSITIONING MECHANISM
Filed March 13, 1945 15 Sheets-Sheet 6

INVENTOR.
ROBERT E. BOYDEN
BY
Fred N. Schwend
ATTORNEY

Jan. 29, 1952     R. E. BOYDEN     2,583,810
ACCUMULATOR STATE CONTROL POSITIONING MECHANISM
Filed March 13, 1945     15 Sheets-Sheet 7

INVENTOR.
ROBERT E. BOYDEN
BY
Fred N. Schwend
ATTORNEY

Jan. 29, 1952  R. E. BOYDEN  2,583,810
ACCUMULATOR STATE CONTROL POSITIONING MECHANISM
Filed March 13, 1945  15 Sheets-Sheet 8
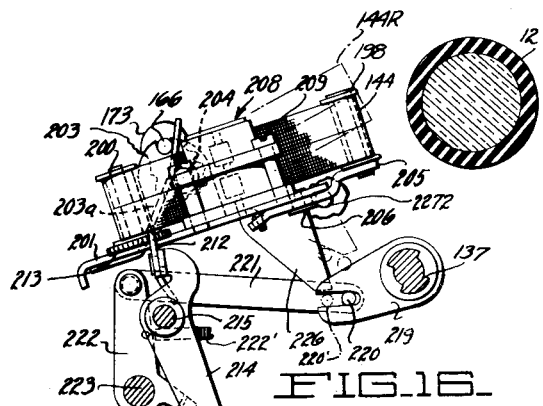
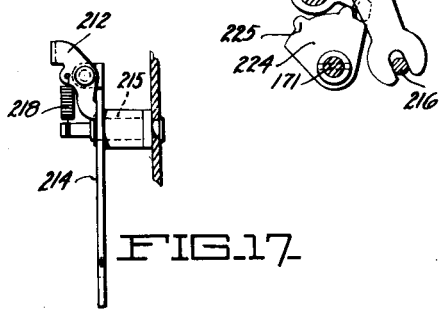
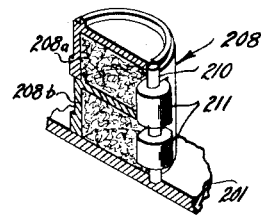
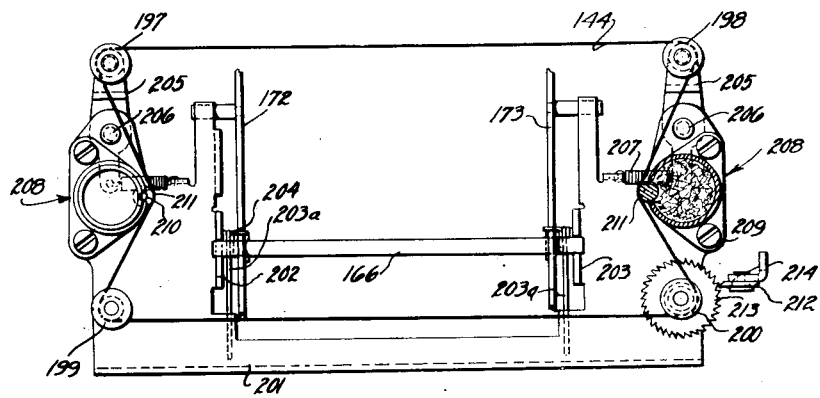
INVENTOR.
ROBERT E. BOYDEN
BY
Fred N. Schwend
ATTORNEY

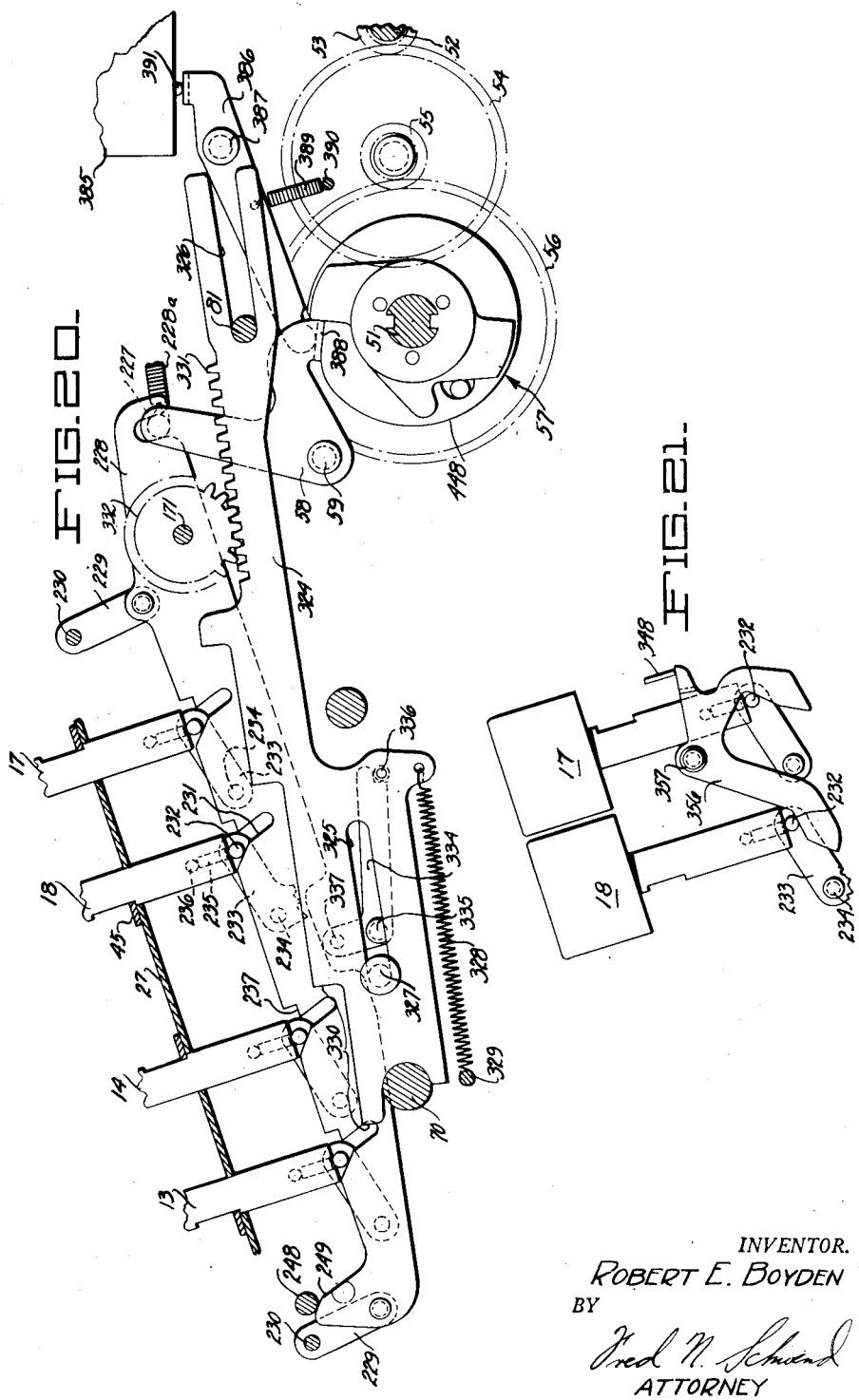

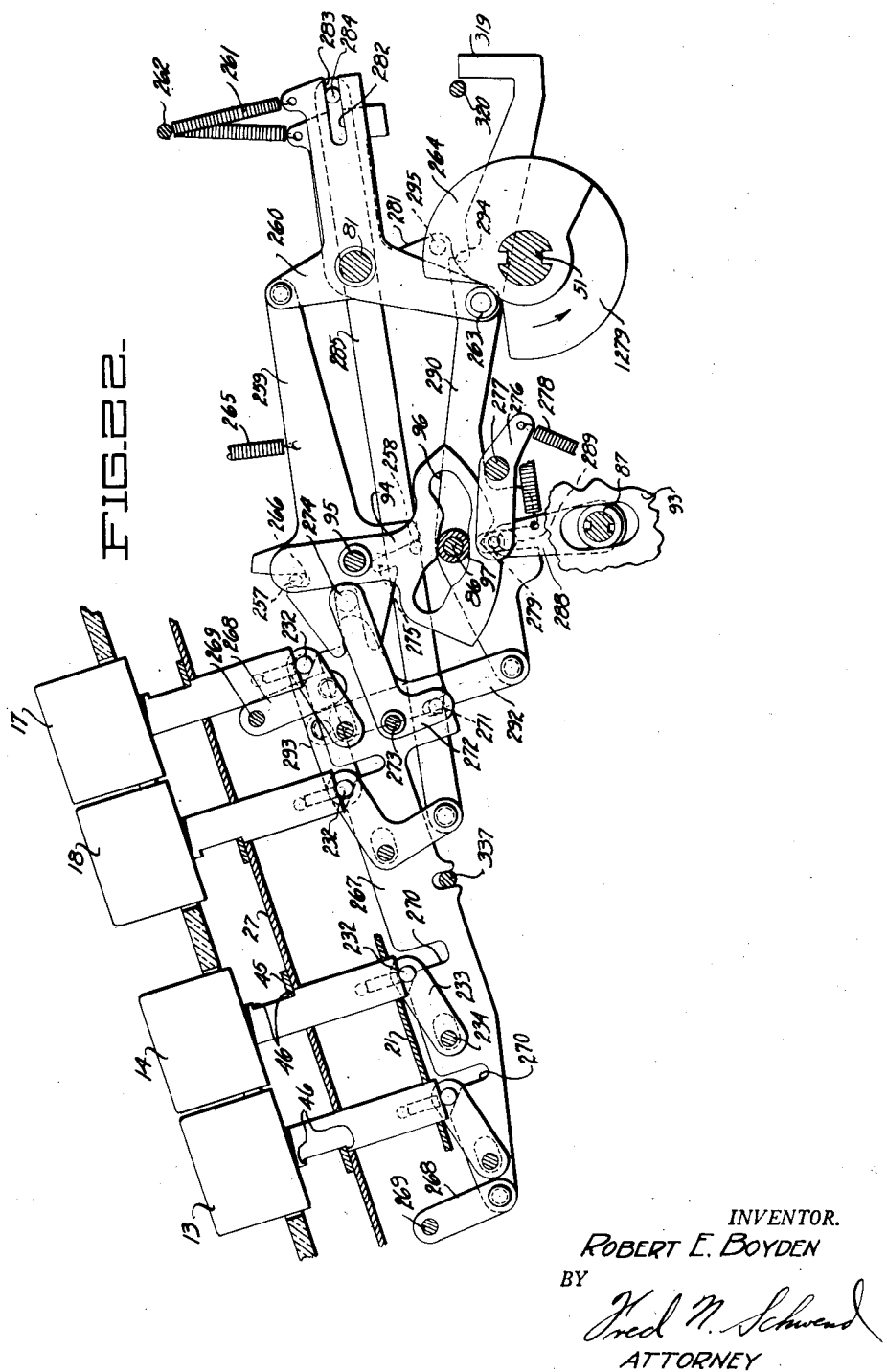

Jan. 29, 1952     R. E. BOYDEN     2,583,810
ACCUMULATOR STATE CONTROL POSITIONING MECHANISM
Filed March 13, 1945     15 Sheets-Sheet 11
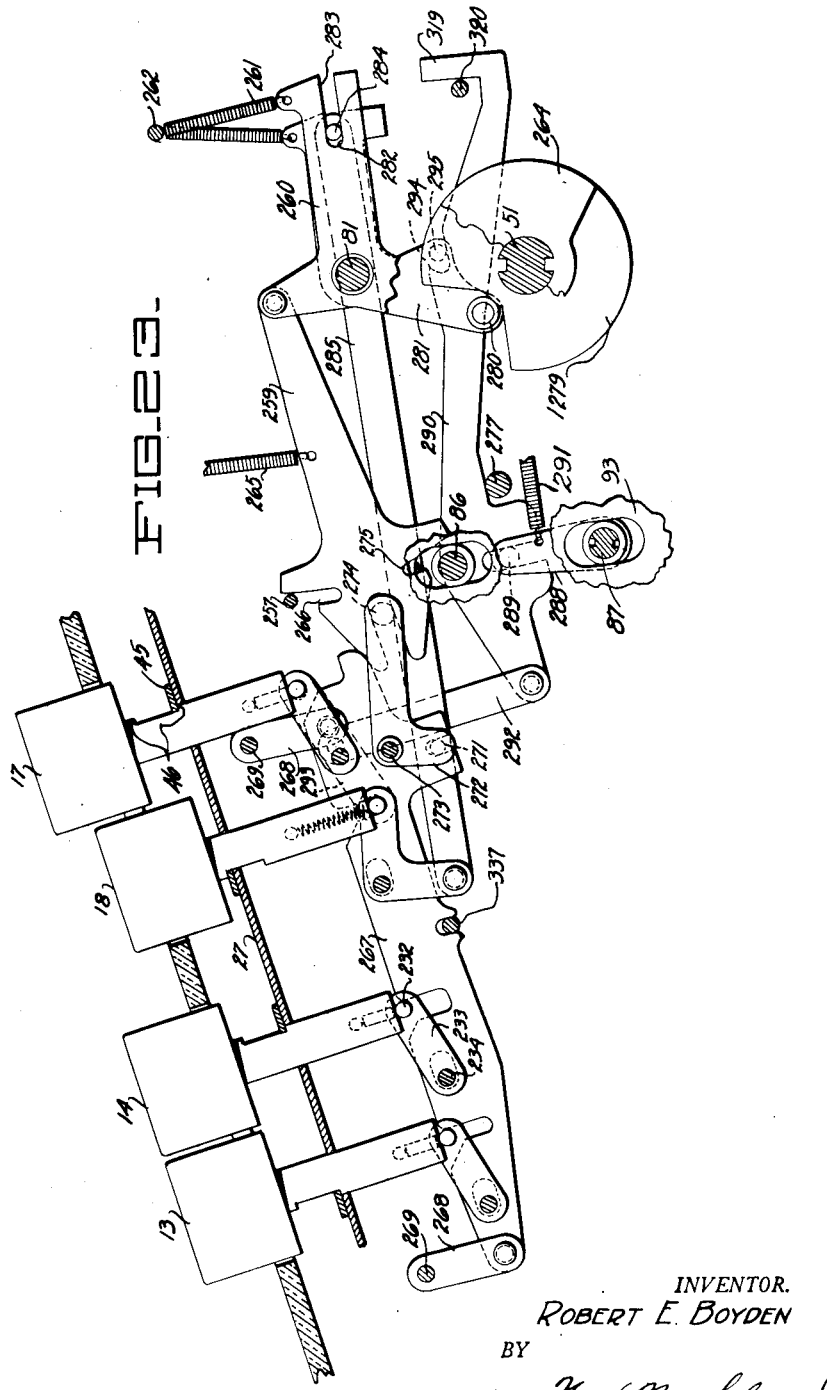
INVENTOR.
ROBERT E. BOYDEN
BY
Fred N. Schwend
ATTORNEY

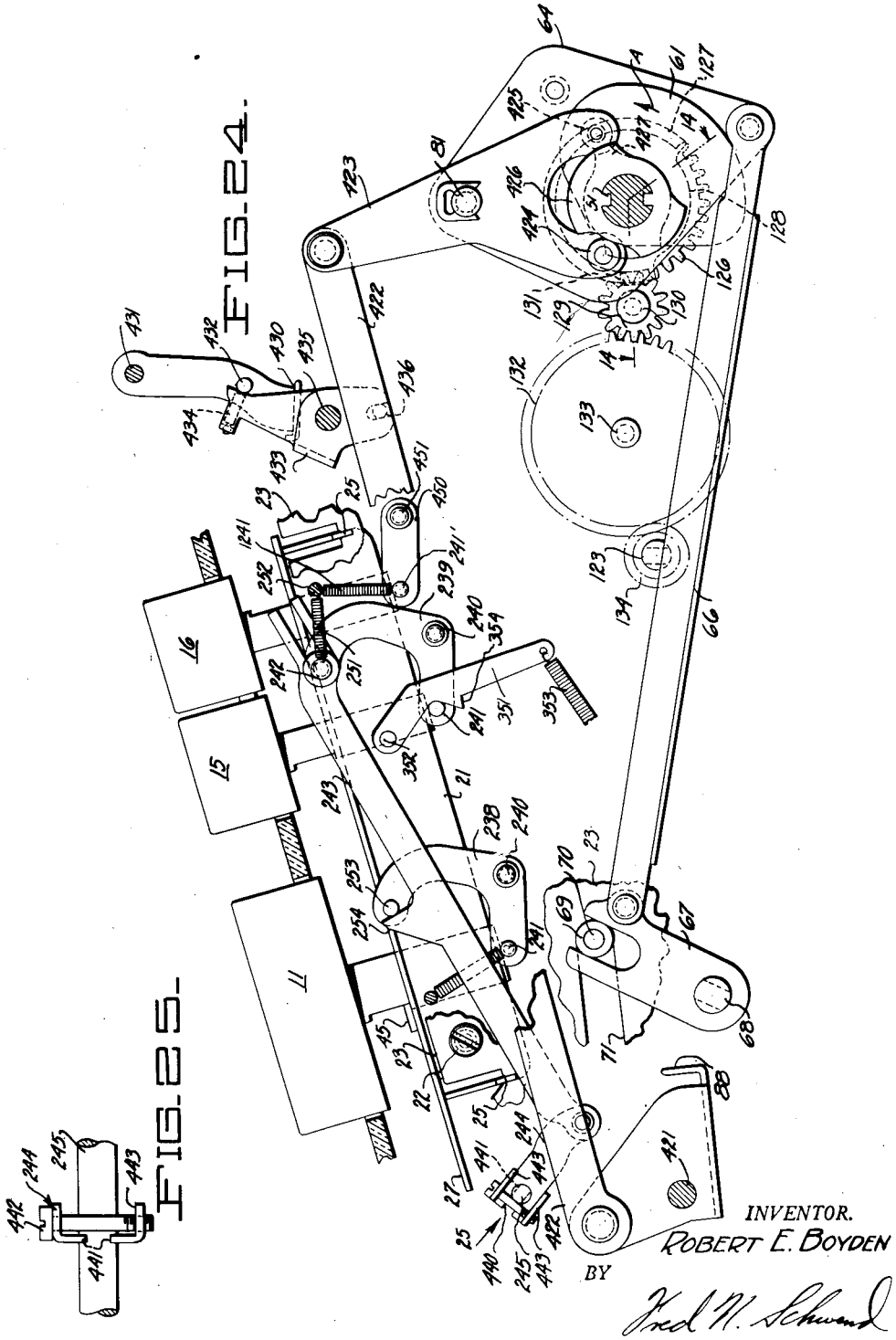

Jan. 29, 1952 R. E. BOYDEN 2,583,810
ACCUMULATOR STATE CONTROL POSITIONING MECHANISM
Filed March 13, 1945 15 Sheets-Sheet 13

INVENTOR.
ROBERT E. BOYDEN
BY
Fred N. Schwend
ATTORNEY

Jan. 29, 1952 R. E. BOYDEN 2,583,810
ACCUMULATOR STATE CONTROL POSITIONING MECHANISM
Filed March 13, 1945 15 Sheets-Sheet 14
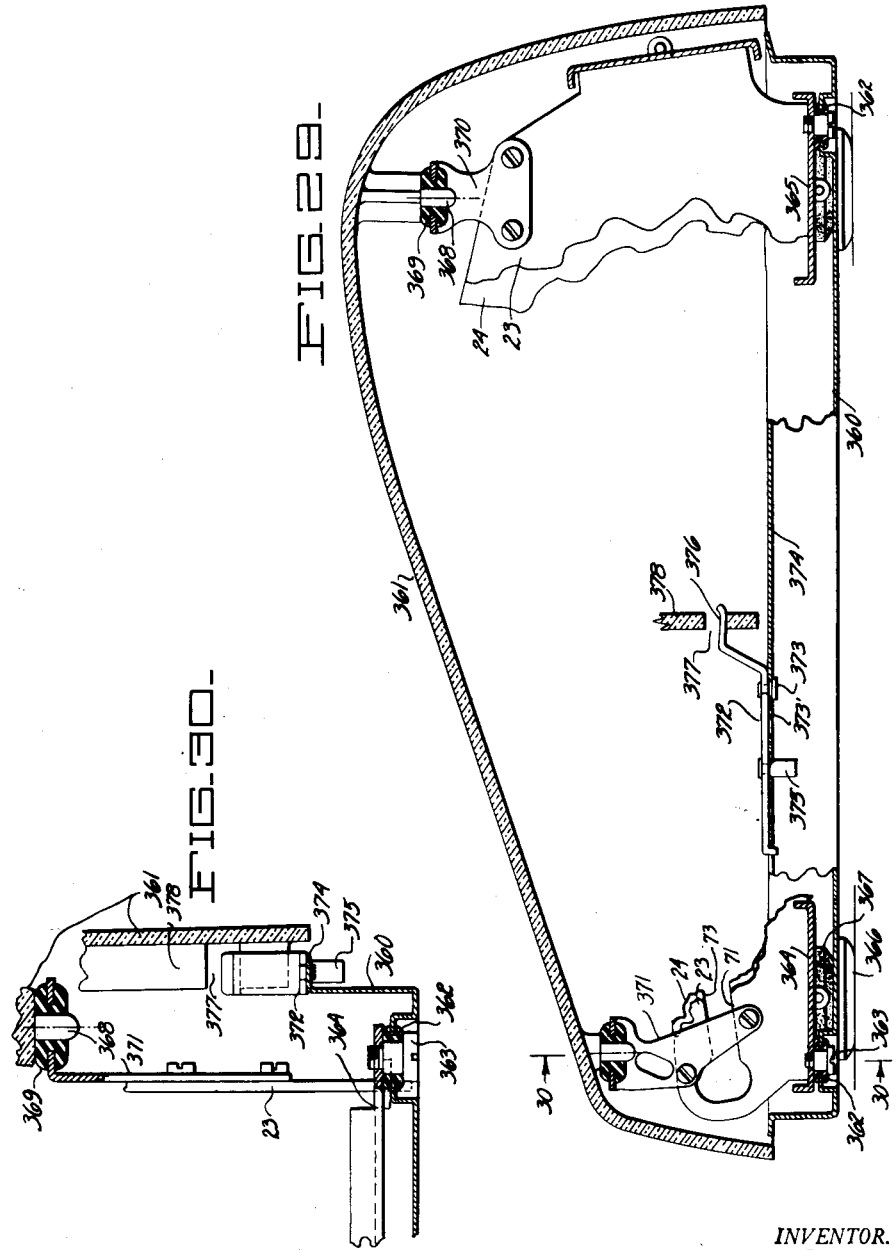
INVENTOR.
ROBERT E. BOYDEN
BY
Fred N. Schwend
ATTORNEY Patented Jan. 29, 1952

2,583,810

UNITED STATES PATENT OFFICE 2,583,810

ACCUMULATOR STATE CONTROL POSITIONING MECHANISM

Robert E. Boyden, Los Angeles, Calif., assignor to Clary Multiplier Corporation, Los Angeles, Calif., a corporation of California Application March 13, 1945, Serial No. 582,553

8 Claims. (Cl. 235—61)

This invention relates to calculating machines and has particular reference to machines commonly known as adding machines which are capable of adding and subtracting and recording the factors and results of such calculations. However, it is to be understood that at least certain phases of the invention may be applicable to other types of calculating machines, for example, those machines capable of automatically performing multiplication and/or division calculations.

One object of the present invention is to facilitate control of a calculating machine and consequently reduce the strain on an operator when operating the machine over long periods of time.

Another object is to simplify the controls of a calculating machine.

Another object is to facilitate repetition of different types of calculations.

The manner in which the above and other objects of the invention are accomplished will be readily understood on reference to the following specification when read in conjunction with the accompanying drawings wherein:

Fig. 1 is a plan view of a machine embodying a preferred form of the invention.

Fig. 2 is a longitudinal sectional view illustrating the general arrangement of the keyboard, accumulator, printer and drive.

Fig. 2A is a side view of an alternate form of value key.

Fig. 3 is a sectional view similar to that of Fig. 2 but illustrating the machine in a phase partly through its operation.

Fig. 4 is a transverse sectional view of the keyboard (with parts broken away) and is taken along the line 4—4 of Fig. 2.

Fig. 5 is a side view of the centralizer for the main shaft.

Fig. 16 is a side view of the ribbon mechanism.

Fig. 17 is a front view of the ratchet feed pawl for the ribbon mechanism.

Fig. 18 is a perspective sectional view of the ribbon rejuvenating device.

Fig. 19 is a plan view of the ribbon mechanism.

Fig. 20 is a side elevational view illustrating the clutch, switch and symbol printing controls.

Fig. 21 is a side elevational view of the total and sub-total bars and the mechanism operable thereby for releasing the keyboard.

Fig. 22 is a side view of the controls for the accumulator and part of the controls for the platen feed mechanism.

Fig. 23 is a view similar to Fig. 22 but illustrating the mechanism conditioned for a sub-total operation.

Fig. 24 is a side view illustrating the rack lock, rack drive and right side motor controls.

Fig. 25 is an end view of a fastening device and is taken in the direction of the arrow 25 of Fig. 24.

Fig. 29 is a longitudinal sectional view illustrating the means for mounting the machine covers on the machine.

Fig. 30 is a transverse sectional view through the mountings for the covers and is taken along the line 30—30 of Fig. 29.

Figure 6:
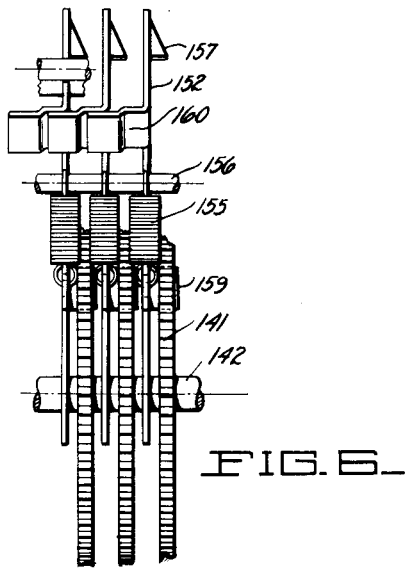
Fig. 6 is an enlarged front view of part of the printer control mechanism and is taken substantially along the line 6—6 of Fig. 2.

The machine is motor driven and the controls are so arranged that each operation control key or bar has complete control of the intended function of the machine so that it is not necessary to first set any conditioning mechanism and then depress a motor control bar.

Referring in general to Fig. 1, an amount to be added or subtracted is entered by depressing appropriate "amount" keys 9. In order to add this amount, one or the other of two add bars 10 and 11 is depressed. This amount is then added into an "accumulator" and is also printed on a paper strip fed over a platen 12. Also, the amount keys are automatically released. If the amount set on the keys 9 is to be subtracted from an amount stored in the accumulator a "minus" bar 13 is depressed.

If it is desired to print an amount set up on the keys 9, but not to add the same in the accumulator a "non-add" bar 14 would be depressed, in which case the amount would merely be printed on the paper strip. If it is desired to add the same amount in the accumulator two or more times, as is generally done in multiplying or when duplicate amounts are to be added, a "repeat" bar 15 is depressed and held down, and the requisite number of additions are made by the machine. In this operation the amount keys are not automatically released. On the other hand, if it is desired to repeatedly subtract the same amount a number of times from a value carried by the accumulator the subtract and repeat bars are simultaneously depressed and held down until the desired number of subtractions are made.

If a wrong amount is set up on the keys 9, the keyboard may be cleared by depressing a "correction" bar 16 which releases the keyboard without starting the motor.

When it is desired to obtain the total of a number of additions or the net total value of additions and subtractions entered into the accumulator, a "total" bar 17 is depressed. This will print the total and will clear the accumulator to zero so that it will be in condition to total a subsequent series of additions and/or subtractions. In the event it is desired to obtain a sub-total, that is, if it is desired to obtain a total without clearing the accumulator, a "sub-total" bar 18 is depressed. This will print the total but will retain the latter in the accumulator so that subsequent values may be added to or subtracted therefrom.

It will be noted on reference to Fig. 1 that the various control bars 10, 11 and 13 to 18, inclusive, are closely grouped around the amount keys 9 so that an operator, when using the well known "touch" system, may easily span whichever control bar he intends to depress along with one or more amount keys to be depressed by the same finger stroke.

It will be noted further that the add bar 10 in the front of the machine extends substantially the width of the keyboard and may, if desired, be extended the full width of the various banks of keys as indicated by the dotted lines 10' whereby the operator may easily strike the bar with his thumb or other finger regardless of the position of his hand relative to the keyboard. Also, the location of the add bar 10 enables convenient depression thereof by the thumb of the operator regardless of which hand he naturally uses in setting up a factor on the keyboard.

Referring particularly to Fig. 1, it will be seen that the spacing of the keys longitudinally of the machine is condensed relative to the spacing thereof laterally. Preferably the longitudinal spacing between key centers is approximately seventeen thirty-seconds of an inch while the lateral spacing is approximately five-eighths of an inch. The longitudinal spacing insures that an operator with normal size fingers and hands may easily span both the add bar 10 and any one of the upper or number nine amount keys so as to simultaneously depress the same.

Also, the provision of the two add bars 10 and 11 insures that one or the other may easily be reached by any digit of the operator's hand depending on his liking or the convenience of one or the other bar to the particular position of his hand when entering different sets of values.

Keyboard

The keyboard is of the flexible type, and each amount key 9 (Figs. 1, 2, and 4), when depressed, serves as a stop to limit the movement of an aligned drive rack 19 which both drives the accumulator to enter therein a value corresponding to the value of the depressed key and also sets the printing mechanism to print the said value.

The keyboard comprises a frame 21 having side walls, the longitudinally extending walls of which are secured by screws 22 (Fig. 24) to machine frame plates 23 and 24 forming part of the main frame of the machine. The front and rear walls of the frame 21 have tabs 25 extending outwardly into notches in the frame plates. This construction enables the keyboard to be adjusted slightly either fore and aft or up and down by bending the various tabs with a suitable instrument and then clamping the frame 21 in its adjusted position by means of the clamp screws 22. To enable this adjustment the screws are threaded in the side walls of frame 21 and pass through enlarged holes in the frame plates. A top plate 27 is securely mounted on the side walls of the key frame 21.

Each of the keys 9 comprises a key top 28 of plastic or similar material and a key stem 29 guided in slots formed in the plate 27 and the frame 21. The key stem has a pair of spaced shoulders 30 which limit the stroke of the keys, while a retainer strip 31 extending along each bank of keys and suitably secured to the bottom of the key frame retains the keys within the slots.

The keys in each bank are yieldably pressed upward by a tension spring 32 extending the length of the keyboard and suitably attached at opposite ends to the plate 27. Said spring rests upon cross ribs 33 formed across slots 34 in the plate 27 and extends within open slots 35 in each of the key stems. Upon depression of a key the adjacent portions of the spring are stretched and extend downwardly through the slots 34.

Means are provided for locking the keys 9 in their depressed positions and for releasing any depressed key. Each key stem has a cam lobe 37 formed thereon which, when the key is pressed downward, rocks a locking bail 38 pivoted at either end thereof to the front and rear side walls of the key frame by trunnion bearings 39 and 40. A spring 41 presses the bail against the series of key stems in any one bank, and when a key is depressed, the cam lobe 37 thereon cams the bail outwardly to release any previously depressed key in the same bank. At the end of the stroke, the cam lobe 37 passes below the bail enabling the latter to retract partially to a position where it latches the key depressed.

A zero stop 42 is attached to each locking bail 38, and when no key 9 in any one bank is depressed the bail 38 of that order will be spring held in an extreme clockwise rocked position in which the zero stop lies directly in front of one of the steps of the associated rack 19 (see the two leftmost bails of Fig. 4), thereby preventing any substantial forward movement of the rack during subsequent phases of the operation. However, when any amount key is depressed and latched downward the locking bail will be held outward sufficiently to retain the associated zero stop out of the path of the aligned rack as shown by the right-hand order illustrated in Fig. 4.

Each amount key has a pyramidal shape and the rectangular bases of the various key tops are so proportioned that each base lies closely adjacent the base of a neighboring key. The sides of each key converge upwardly from the base as shown in Figs. 2 and 4 to a top surface 43 having considerably smaller area than the base. This reduction in the area of the top surface reduces the tendency of an operator's finger to span two adjacent keys if his finger were not correctly positioned over the desired key. The arrangement of the key tops in juxtaposition with each other reduces the amount of dust and dirt which may fall between the same and also facilitates cleaning of the keyboard.

It will be noted that the line of intersection between the base of each key top and its converging sides lies substantially in the plane of the surface of the machine cover 361 (to be described hereinafter) so that such lines of intersection appear coextensive with the plane of the adjacent portions of the machine cover. Also, it will be noted that each of the key top bases is provided with a short vertical skirt which effectively blocks from view the interior of the machine when a juxtaposed key is depressed.

If desired, the skirt of each of the various key tops may be arranged in a color or color tone which contrasts with the color of the remaining portion of the key top so that when a key is depressed as shown in Fig. 2 the surrounding skirts of the various adjacent keys will become readily apparent so as to indicate to the operator the location of the particular key depressed.

Further, the top surfaces 43 are formed at an angle to the general plane of the keyboard when viewing the same from the side of the machine and are preferably formed so that each is in a substantially horizontal plane. This construction reduces the tendency of an operator's fingers to span two adjacent longitudinally disposed keys since none of the surfaces 43 is in a plane common with that of an adjacent key when viewed from the side. Thus, when the operator's finger strikes a key, as indicated by the dotted line 44 of Fig. 2, the key in the rear thereof presents a vertical wall to the finger while the key in front thereof will have its rear edge substantially below the front surface of the key being depressed and, as a result, there should be no tendency for the operator's finger to depress this latter key until the key being depressed is well through its stroke. Further, it will be noted in Fig. 4 that the top surfaces 43 are slightly concave when viewed from the front to conform with the operator's finger.

In view of the juxtaposed positions of the various key top bases the need for the usual keytop plate, through which the various key tops usually extend, is eliminated along with the attendant glare caused by the flat reflective surface of the plate. The curved upper surfaces 43 of the keytops further attribute to the reduction of glare by eliminating any flat light reflecting plane or surface which might reflect light into the operators eyes.

A further feature tending to reduce eyestrain is the pyramidal form of the keytops which reduces shadows formed by the keytops and their consequent confusion of total values presented to the operator's eyes.

Fig. 2A illustrates an alternative key construction in which the top surface 43a is formed substantially parallel to the plane of the keyboard.

Referring to Figs. 22 and 24, the stems of the various control bars 11 and 13 to 18, inclusive, are also slidably mounted within the key frame 21 and plate 27 and are limited in their stroke by retainers 45 which are adapted to be engaged by upper and lower shoulders 46 formed on the respective control bar stems.

The add bar 10 (Figs. 1 and 2) located at the front of the machine and extended across the keyboard is also guided by the key frame by means of brackets one of which is shown at 47, secured by screws 48 to the frame. Two control bar stems of the bar 10 (one of which is shown at 50) slide vertically within slots formed in the plate 27 and brackets 47.

*Drive*

One feature of the present machine is the provision of a main shaft 51 (Figs. 2, 5, 14, 15, 20, 22, 23, 24, 26 and 28) rotatable through 360 degrees during each cycle and carrying various cams for operating different components of the machine. The main shaft also drives the reciprocating mechanism for moving the accumulator drive racks 19 through their strokes. Thus, the cams may be designed to incorporate any desired characteristics which may vary throughout the cycle.

Referring to Fig. 20, the drive shaft 52 of the motor (not shown) is entrained with the shaft 51 through a gear train comprising a pinion 53 on the motor shaft which meshes with an idler 54 having a pinion 55 secured thereto and meshing with a gear 56 rotatable on shaft 51 and suitably connected to the driving side of a cyclic clutch generally indicated at 57, the driven side of which is secured to the shaft 51.

Since cyclic clutches suitable for the present purpose are well-known in the art it is not deemed necessary to describe the same in detail.

The clutch is controlled by a dog 58 pivoted to the frame at 59 and arranged to effect engagement of the clutch upon counter-clockwise rocking thereof away from the clutch. Disengagement of the clutch is effected by rocking the dog 58 clockwise into the position illustrated in Fig. 20.

Referring to Fig 5, a centralizer 379 having a roller 380 thereon is pivoted on a cross shaft 81 and is pressed against a centralizer disc 381 by a spring 382 tensioned between the centralizer and a portion of the machine. The disc 381 is fastened to the drive shaft 51 and has a notch 383 therein adapted to be engaged by the roller 380 when the shaft 51 is in full cycle position.

Figure 14:
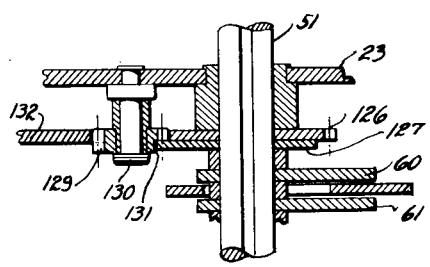
Fig. 14 is a sectional view illustrating the tens-transfer drive and the rack drive cams, and is taken along the line 14—14 of Fig. 24.
Figure 15:
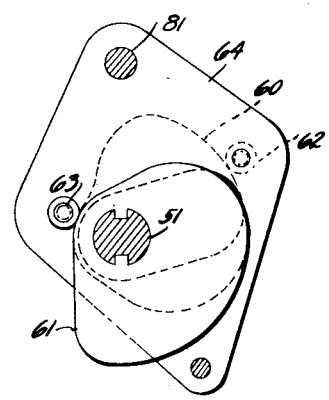
Fig. 15 is a side view of the rack drive cams and cam follower.

Means are provided for yieldably transmitting a drive from the shaft 51 to the various drive racks 19, Fig. 2, located in the different orders of the machine. Referring to Figs. 14, 15 and 24 in particular, a pair of complementary rack drive cams 60 and 61 are keyed to the shaft 51 adjacent the right-hand end thereof. These cams are engaged by rollers 62 and 63, respectively, mounted on a cam follower plate 64 straddling the shaft 51 and pivoted on a cross shaft 81. A link 66 is pivotally connected between the cam follower plate 64 and an arm 67 secured to a rock shaft 68 which is journalled in bearings (not shown) formed in the machine frame plates. The upper end of the arm 67 is bifurcated to embrace a roller 69 journalied on one end of a rack drive shaft 70. The roller 69 also is guided for transverse movement within a longitudinally extending slot 71 in the frame plate 23.

A roller 72 (Fig. 2) on the opposite end of the shaft 70 is guided along an elongated slot 73 (similar to slot 71) in the left-hand machine frame plate 24 and a second arm (not shown) similar to arm 67 is preferably fixed to the shaft 68 to guide the left-hand end of shaft 70 and thereby insure parallel movement of the latter during its transverse shifting movement.

Referring to Fig. 2, each of the drive racks 19 has an elongated slot 730 therein, open at one end, and embracing the shaft 70 whereby to support the forward end of the rack. The slot 730 terminates in opposed lateral depressions 74 at its closed end. Each of these depressions 74 is normally engaged by a roller 75 carried by a pawl or drive element 76 which is rockably fitted within a groove in the shaft 70. The adjacent drive elements 76 associated with any one rack 19 are spring urged in opposite directions about shaft 70 by a tension spring 77 connected between the tails of the two elements, thus forming a yieldable connection between the shaft 70 and the respective drive rack 19.

When, during the forward movement of the shaft 70, a particular rack 19 is stopped due to striking a depressed key stem 29, or the associated zero stop 42 or a stationary "nine" stop 420, the rollers 75 will ride out of the depressions 74 against the action of spring 77, thus breaking the connection between the shaft and rack.

It will be noted from the above construction that the same amount of reaction will be required to break the connection between the shaft 70 and various racks 19 regardless of the amount of travel of the latter until the breaking point is reached. Also, it will be noted that after the connections have broken, there will be only a small drag offered thereby to the forward movement of the shaft 70. However, this drag, due to the friction between the rollers and their supporting studs, is sufficient to prevent rebound of the racks after the connections have been broken, thus preventing mispositioning of the same.

During the return movement of the shaft 70, the rollers 75 will move along the slot 73 until they snap into the depressions 74 thus reconstituting the connection.

Referring to Figs. 2 and 3, each rack 19 is provided with equally spaced shoulders 79, the spacings of which are slightly larger than the spacings of the keys 9 so that the rack, when advanced toward the front of the machine, will strike the lower end of a depressed key after it has been moved a number of increments equal to the value of the depressed key. In the event a "nine" amount key has been depressed the rack will not be stopped thereby but will continue until the second shoulder 79 from the front thereof strikes the "nine" stop 420 attached to the forward wall of the key frame 21.

Each rack, in addition to being guided by the shaft 70, is provided with a slot 80 adjacent to the rear end thereof which is guided over the stationary cross rod 81 extending between the machine frame plates.

A rack gear section 82 is formed on the upper edge of each of the racks for the purpose of meshing with one of a series of gears operatively connected with the printer mechanism as will be described hereinafter. Also formed on each rack 19 is a pair of opposed rack gear sections 83 and 84 disposed on opposite sides of an associated accumulator gear or element 85 rotatably mounted on an accumulator shaft 86 forming part of the accumulator unit.

A series of notches 871 are formed on the under forward edge of each rack 19 and are spaced apart distances equal to the different increments of movement of the rack, and are adapted to be engaged by a locking bail 88 before and after both the forward and the return movements of the rack. For this purpose the locking bail is pivoted at opposite ends on frame pins 421 and is connected by means of a link 422 (Fig. 24) to a cam follower 423 pivoted on the shaft 81 and carrying rollers 424 and 425 which ride on complementary cams 426 and 427, respectively, keyed on shaft 51.

*Accumulator*

The accumulator is of the two-directional subsequent transfer type capable of receiving either additions or subtractions.

Referring to Figs. 8 to 13, inclusive, the accumulator unit is arranged to be raised or lowered for the purpose of engaging the various accumulator gears 85 (forming the accumulator elements) with either of the rack gear sections 83 or 84 (Fig. 2) of the racks 19 in accordance with the type of problem to be performed. During an additive operation the accumulator is lowered to mesh the gears 85 with the lower rack gear sections 84 whereby the gears will be rotated in a clockwise direction during the subsequent forward rack movement, while, during a subtractive operation, the accumulator is raised to mesh the gears 85 with the upper rack gear section 83 so that the subsequent forward rack movement will drive the gears in a counterclockwise direction.

The accumulator comprises in general the accumulator shaft 86 and a second shaft 87 both rotatably mounted in a series of ordinarily spaced brace plates 88, rigidly held in spaced relation with each other by a pair of suitable combs 89 to which each plate is locked. A rod 90 is passed through the various plates adjacent each comb to hold the latter in place.

The shafts 86 and 87 have rollers 86a and 87a, respectively, (Fig. 13) on opposite ends thereof which are guided in vertical slots 91 and 92, respectively, formed in plates 93 suitably attached in a manner not shown to the machine frame plates 23 and 24 (Fig. 4).

For the purpose of raising and lowering the accumulator unit in accordance with the type of problem being performed, a box cam 94 (Fig. 22) is pivoted on a frame stud 95 and has a cam groove 96 therein embracing a roller 97 rotatably mounted on the shaft 86 at the left-hand end thereof. Clockwise rocking movement of the cam 94 in a manner to be described hereinafter will lower the accumulator to its additive position, while counter-clockwise rocking thereof from its illustrated position will raise the accumulator to its subtractive position.

Figure 8:
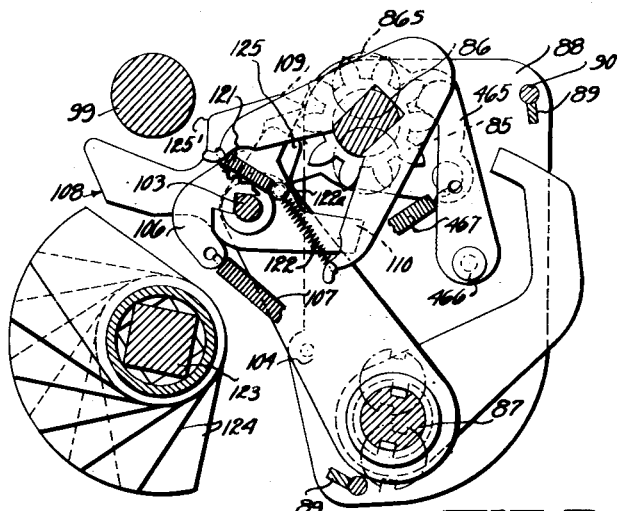
Fig. 8 is a sectional view through the accumulator and is taken along the line 8—8 of Fig. 11.
Figure 10:
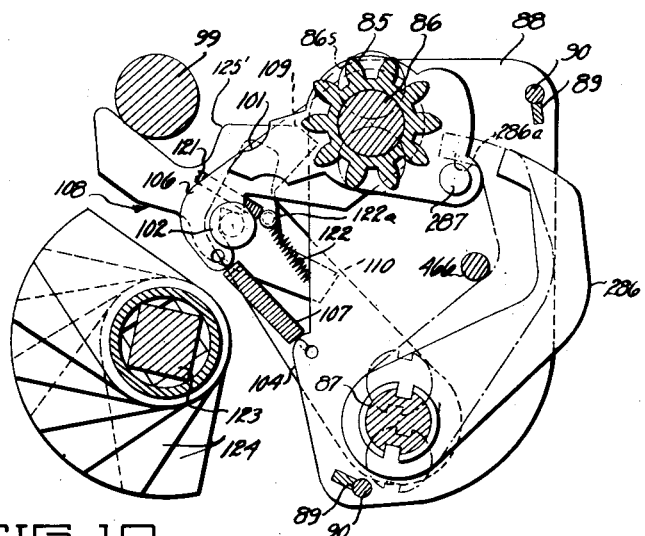
Fig. 10 is a sectional view similar to that of Fig. 9 but showing the parts in condition for effecting a transfer.
Figure 11:
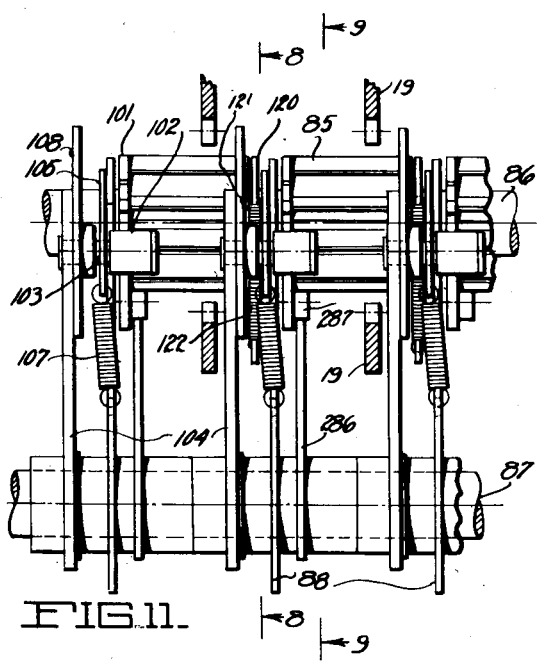
Fig. 11 is a lateral view of two orders of the accumulator and is taken substantially along the line 11—11 of Fig. 9.

It will be noted on reference to Figs. 2 and 8 or 10 in particular, each of the gears 85 has ten teeth thereon, the pitch of which is equal to the increments of movement of the rack from one value to the next so that the rotation of a gear from one tooth to the next represents mechanically the entry or removal of the value of one digit to or from the accumulator.

Figure 13:
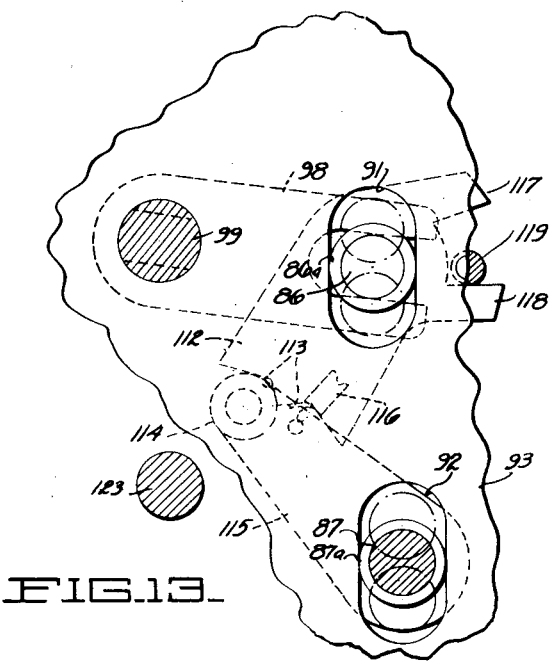
Fig. 13 is a side view illustrating the mechanism for adjusting the accumulator to "add" or to "subtract" conditions.

In order to insure parallel movement of the accumulator unit as it is raised and lowered, a pair of arms, one of which is shown at 98, Fig. 13, are fastened at opposite ends of a rockable shaft 99, suitably journalled in the plates 93, and each arm is bifurcated to embrace the shaft 86 to control movement of the latter.

During the digitizing phase of each operation and as any one of the accumulator gears 85 moves through one complete revolution or ten tooth spaces as the result of accumulating ten digits in its associated order, it conditions a transfer mechanism to subsequently enter one digit into the next arithmetically higher order. That is, if a transfer is made during addition one digit will be entered into the adjacent left-hand gear 85 (viewing the machine from the front) by rotating that gear one tooth in a clockwise or additive direction. On the other hand, if a transfer is made during subtraction, one digit will be subtracted from the adjacent left-hand gear by rotating that gear one tooth in a counter-clockwise or subtractive direction.

For the purpose of effecting a transfer, each gear 85 has a transfer tooth 101 fastened thereto, and adapted to engage a roller 102 (Figs. 9, 10, and 11) journalled on a stud 103 extending from a transfer arm or carrier 104 located in the next order to the left. Arms 104 are freely pivoted on the shaft 87. The arm 104 is yieldably held in one or the other of two positions by a centralizer arm 106 pivoted on the shaft 86 and provided with two notches either of which is adapted to engage the stud 103. A spring 107 is interposed between the centralizer and the adjacent brace plate 88.

Figure 9:
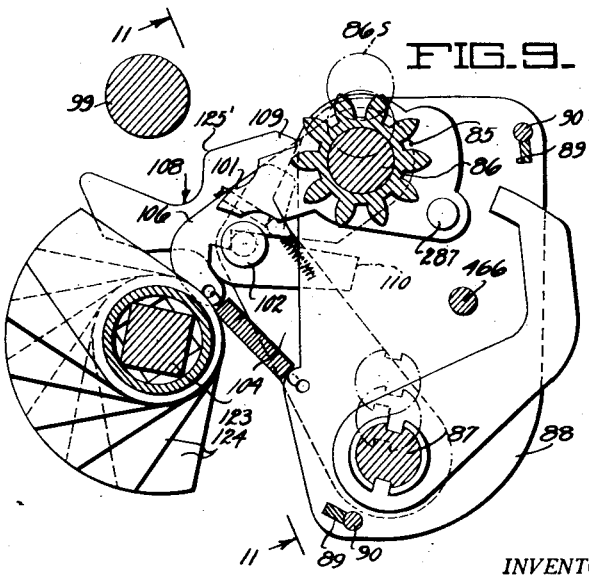
Fig. 9 is another sectional view through the accumulator and is taken along the line 9—9 of Fig. 11.

As each gear 85 rotates in either direction through one complete revolution or between its zero and nine positions (its zero position being shown in Figs. 9 and 10), the associated transfer tooth 101 strikes the roller 102 and rocks the arm 104 outward from its normal position illustrated in Figs. 8 and 9 to the position illustrated in Fig. 10.

Pivoted on each stud 103 is a transfer pawl 108 formed with two diverging fingers 109 and 110 located on opposite sides of the associated gear 85. The pawl 108 is rocked into either of two positions indicated in Figs. 10 and 12 depending on the direction of transfer to be effected whereby to engage one or the other of the fingers 109 and 110 with the gear 85. During the subsequent transfer phase the arm 104 is rocked rearward into its normal position causing whichever transfer pawl finger is in engagement with the gear 85 to drive the gear one tooth in the appropriate direction.

In order to yieldably hold each gear 85 in registered position, a pawl 465 is pivoted at 466 on the adjacent brace plate 88 and is held against the respective gear 85 by a spring 467 extending between the pawl and a suitable point on the plate 88.

Means are provided for conditioning the transfer mechanism to effect an additive or subtractive transfer depending upon the direction in which the accumulator is driven. As was disclosed hereinbefore, the accumulator is lowered from its neutral position during additive operations and is raised from its neutral position during subtractive operations. This movement is utilized to condition the transfer mechanism to drive the gears in the correct direction.

Referring to Fig. 13, a throw-over lever 112 is fixed to the shaft 86 and has two centralizing notches 113 formed thereon either of which is engaged by a roller 114 on a centralizer arm 115 pivoted on the shaft 87 and pressed against the lever 112 by a tension spring 116. The rear end of the lever 112 is bifurcated forming two extensions 117 and 118 either of which is adapted to engage a stationary stud 119 extending from the plate 93 for the purpose of rocking the lever 112 and shaft 86 when the latter is raised and lowered.

Figure 12:
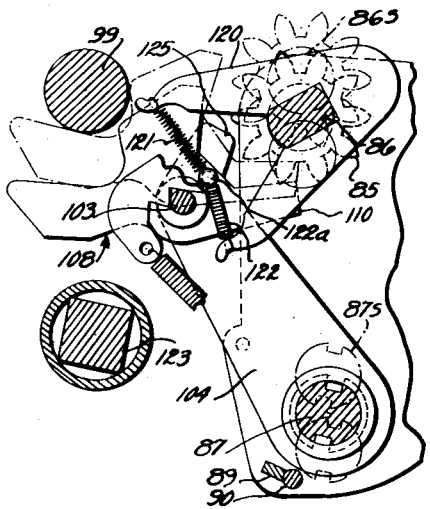
Fig. 12 is a sectional view similar to Fig. 8 but illustrating the accumulator in a "subtract" condition and in a condition which it assumes during "sub-total" operations.

Located in each order of the accumulator is a U-shaped spring carrier 120 (Figs. 8, 11 and 12) secured in a slot formed in the shaft 86. The two arms of the carrier support the ends of two tension springs 121 and 122, the other ends of which are connected to a stud 122a fastened to the transfer pawl 108 immediately behind the pivot stud 103. Rocking of the shaft 86 in one direction will tension one of the springs and relax the other, thereby urging the transfer pawl in one direction, while rocking of the shaft in the opposite direction will tension the previously relaxed spring to consequently urge the pawl in the opposite direction. The shaft 86 is illustrated in Figs. 8 and 13 as being rocked into a counter-clockwise position, thereby urging the transfer pawls in a clockwise direction, to engage the fingers 109 with the gears 85, while Fig. 12 illustrates the shaft 86 in its clockwise rocked position in order to engage the fingers 110 with the gears.

Referring to Fig. 13, it will be noted that the spacing between the two extensions 117 and 118 is such that the movement of the accumulator from its neutral to its lowermost (additive) position when it is in additive condition will not affect the angular position of the shaft and, therefore, the spring carriers 120 will remain in their positions illustrated in Fig. 8, wherein they hold the transfer pawls conditioned to cause the upper transfer fingers 109 to drive the associated gears 85 in a clockwise direction during the transfer operation. However, when the accumulator is raised to its subtractive position from its neutral position, i. e., when the shaft 86 is moved to its upper position shown by dotted line 86S, the lower extension 118 of the lever 112 will ride against the pin 119, thus rocking the shaft 86 clockwise until the lowermost notch 113 is engaged by the roller 114 of the centralizer, so as to condition the pawls 108 as indicated in Fig. 12. This position will be retained until the accumulator is subsequently dropped into its lowermost addition position. Thus the transfer mechanism is only reconditioned for a change in the direction of transfer when the type of operation is changed.

Figure 31:
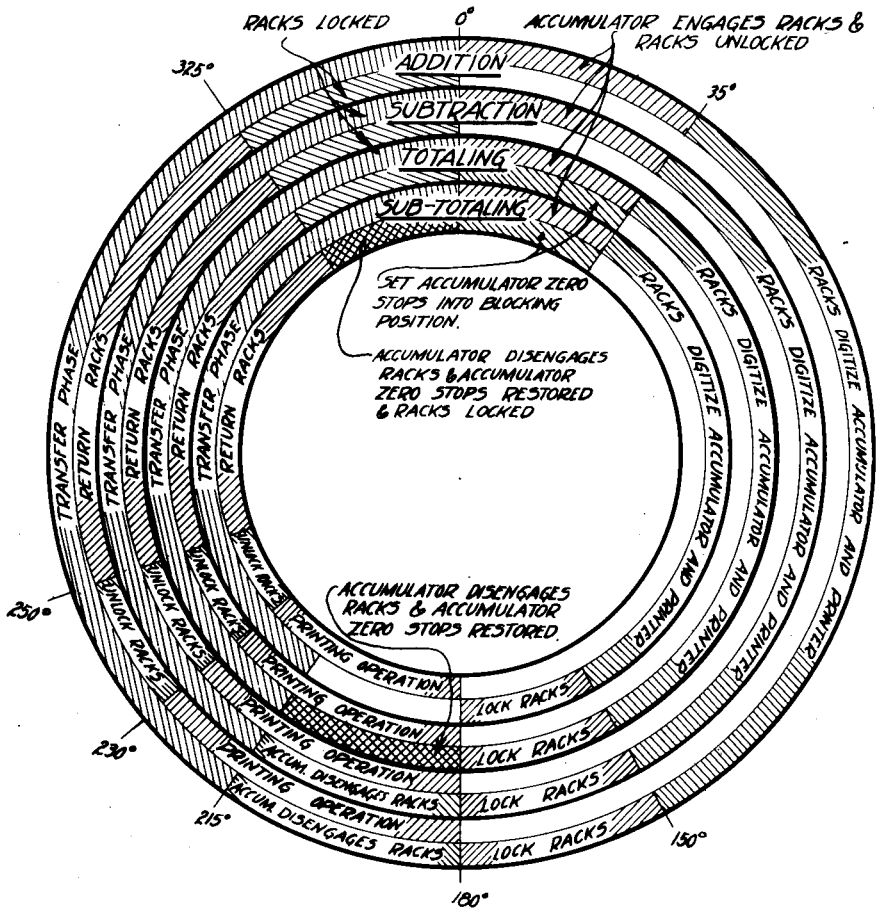
Fig. 31 is a timing chart illustrating generally the successive phases of operation of the machine.

It will be noted on reference to Fig. 31 that during addition and subtraction operations the accumulator will be disengaged from the racks, that is, it will be returned to neutral position as shown in Figs. 8 and 10, prior to the transfer phase. Therefore, all of the transfer arms which have been conditioned for transfer will assume their positions illustrated in Fig. 10, while the transfer pawls 108 will, if the operation is an addition, also assume the positions shown in Fig. 10. However, if the operation is a subtraction, the transfer pawls will have been rocked counter-clockwise to their positions illustrated in Fig. 12.

Means are provided for effecting the transfer sequentially across the various orders of the machine beginning with the lowermost or right-hand order. For this purpose a transfer shaft 123 is rotatably mounted in the side plates 93 in a manner not shown and has a square cross section on which are splined a series of transfer cams 124 arranged in a helical series. The cams are equi-angularly arranged so that when the shaft 123 is subsequently rotated, the cams will sequentially engage the rollers 102 of the respective transfer arms which have been previously conditioned to effect the transfer.

For the purpose of facilitating assembly and manufacture of the cams 124 and to enable interchangeability of the cams, they are all made identical with symmetrical contours and each is provided with an octagonal opening adapted to be fitted over the square section of the shaft 123. Also, a line through two diametrically opposed points in the opening lying adjacent the axis of symmetry extends at 22½ degrees from said axis so that by appropriately fitting the cams over the shaft they may be arranged at 22½ degrees from each other.

During the transfer operation, as each arm 104 is forced rearward by its cam 123 to cause the finger 109 or 110 of the associated transfer pawl 108 to engage and drive the aligned accumulator gear 85, a lobe 125 on said arm is forced between two of the teeth of the accumulator gear whereby to prevent an overthrow of the gear regardless of the speed imparted thereto by the active finger of the transfer pawl. As the arm 104 reaches its rearward position it is retained therein by the centralizer 106 until it is again conditioned for a transfer by the tooth 101.

Considering an example in which a value 9999 is accumulated in the accumulator and the value 1 is entered into the right-hand gear 85, a transfer condition will be set up due to the fact that the transfer tooth 101 in the right-hand order will have passed from the "nine" to the zero position thus rocking the transfer arm in the next order outward. During the subsequent transfer operation, the first transfer cam 124 will strike the roller 102 of the conditioned transfer arm 104, rocking the arm rearward and causing the transfer pawl 108 to advance its gear 85 (already standing at 9) one increment at which time its transfer tooth 101 will rock the transfer arm 104 of the next higher order outward before the associating cam 124 moves into position to drive the same rearward. Thus, a transfer will occur across the various orders resulting in the value 10000 being registered in the accumulator.

It will be noted in Fig. 31 that during sub-totaling operations the accumulator is not disengaged from the racks until the end of the cycle and, therefore, some provision must be made to prevent operation of the transfer mechanism from affecting digitizing of the accumulator gears 85 during the time normally allotted for the transfer phase. For this purpose the transfer pawl 108 is provided with a projection 125'. During a sub-total operation the accumulator is raised into its subtractive position in which the shafts 86 and 87 assume their dotted line positions 86S and 87S, while the transfer pawls are rocked counter-clockwise due to the subtractive setting of the shaft 86. Now, as the arms 104 are carried upwardly by the accumulator unit, the projections 125' engage the shaft 99, rocking the transfer pawls so as to retain both fingers 109 and 110 out of engagement with the associated gears 85 as indicated by the dot and dash lines of Fig. 12.

Means including a Geneva gear mechanism are provided for rotating the shaft 123 during the latter part of the machine cycle. As illustrated in Figs. 14 and 24, a mutilated gear 126 and a disc 127 are keyed in juxtaposition with each other on the shaft 51, the disc 127 having a depression 128 formed in the edge thereof in alignment with the teeth of the gear 126. The gear 126 is adapted to mesh with a wide pinion 129 rotatably mounted on a frame stud 130. The portion of the pinion 129 in alignment with the gear 126 is fully toothed, while the portion thereof which is in alignment with the disc 127 has a pair of adjacent teeth cut away to form a bearing surface 131 against which the periphery of the disc 127 normally rides, whereby to prevent rotation of the pinion whenever the teeth of gears 126 are out of mesh with the teeth of the pinion. Therefore, during approximately two-thirds of the revolution of the shaft 51 in the direction of the arrow A the disc will merely ride against the bearing surface 131 of the pinion until the teeth of the gear 126 mesh with the full toothed portion of the pinion teeth, permitting rotation of the latter by the gear 126. Pinion 129 is arranged to drive the transfer shaft 123 through an idler 132 journalled on a frame stud 133 and meshing with a pinion 134 fixed to the shaft 123.

*Printer*

The printer (Figs. 2, 3 and 6) comprises a series of numeral printing dials or elements 135 equal in number to the number of drive racks 19. Each numeral dial has thereon a series of type ranging from zero to 9 and these dials are so connected to the associated racks that they will print a digit corresponding to the value of the key depressed in the associated key bank or to the numerical position to which the rack is moved in its forward stroke.

Each dial 135 is rotatably mounted on a separate lever 136 which is loosely keyed on a printer control shaft 137 and spring-urged clockwise by a tension spring 138 extended between the lever 136 and a suitable portion of the frame. Each dial 135 has secured thereto a gear 139 permanently meshed with a gear 140 also rotatably mounted on the associated lever 136. When a lever 136 is held in its normal position illustrated in Fig. 2, by the shaft 137, the gear 140 is meshed with an aligned one of a series of large idler gears 141 rotatably mounted on a cross shaft 142. The latter idlers are continuously entrained with respective ones of the drive racks 19 through a series of pinion assemblies to be described presently.

At approximately the mid-point in a machine cycle, as indicated in Fig. 31, and after the racks have digitized the accumulator and printer, the printer control shaft 137 is rocked clockwise permitting the springs 138 to rock the printer arms 136 and thus carry the printing dials 135 forward into contact with a printing ribbon 144 and the paper strip (not shown) which is carried on the platen 12, whereby to print the number registered on the dials onto the paper at the printing point.

Figure 28:
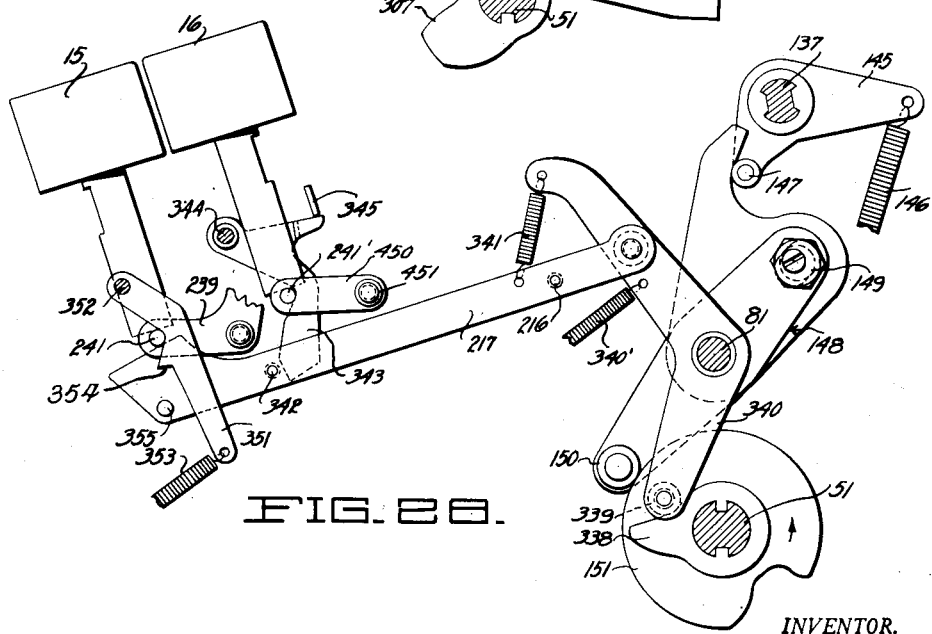
Fig. 28 is a side view illustrating the key release mechanism and the printer control shaft operating device.

Referring to Fig. 28, the shaft 137 is fastened to a lever 145 urged clockwise by a strong tension spring 146 and provided with a roller 147 held against a compound camming lever assembly 148. The latter comprises two parts, both pivoted on the cross rod 81 and secured together for relative angular adjustment by a suitable clamp screw 149. A roller 150 on the lower end of the lever assembly rides on the periphery of a cam 151 keyed to the drive shaft 51. The latter is so arranged that as the machine passes through 180 degrees of its cycle, the spring 146 is permitted to rock the shaft 137 clockwise to effect the printing.

Means are provided for preventing printing of zeros to the left of the highest significant digit being printed while enabling all zeros to the right thereof to be printed. For example, the machine will print the value "800.00" as "800.00" instead of as "000800.00." For this purpose a latch 152 (Figs. 2, 3 and 6) is provided adjacent each lever 136 and journalled on a cross rod 153 extending through cam slots 154 in the various idler gears 141. The levers 152 are urged clockwise by tension springs 155 extending between the levers and a cross pin 156, and are provided with ears 157, each adapted to normally overlie a foot 158 extending forwardly from an aligned lever 136. A roller 159 rides in the cam slot 154 and when the associated idler 141 and printing dial 135 are retained at zero position the contour of the cam slot enables the spring 155 to rock the lever 152 to its fullest extent as illustrated in Fig. 2 wherein it overlies the foot 158 of lever 136 and thus prevents the latter from being rocked during the printing operation. However, when any idler gear 141 is rotated to its "one" or other position its cam slot will rock the associated lever 152 outwardly to the position illustrated in Fig. 3, thereby enabling the associated lever 136 to be subsequently rocked into printing position. As will be noted in Fig. 6, of each of the latch levers 152 is provided with an ear 160 overlying the corresponding ear on the lever to the left. Therefore, when any latch lever 152 is rocked outwardly by its gear 141, all of the levers 152 to the right thereof will likewise be rocked outwardly by virtue of the overlapping ears 160.

In order to hold the various gears 141 in registered positions during the time that the associated gears 140 are demeshed therefrom a locking bail 430 is provided, extending across the various gears 141 and normally engaged between two of the teeth thereof. The bail is pivoted on frame studs 431 (Fig. 24) and is provided with a pin 432 conected to a second bail 433 by a spring 434 which normally holds the pin 432 thereagainst. Bail 433 is pivoted on a frame stud 435 and is pivotally connected by a pin and slot arrangement 436 to the hereinbefore mentioned link 422.

Means are provided for retaining each printer dial 135 in its registered position after the gear 140 entrained therewith is demeshed from its idler 141. For this purpose a centralizer pawl 161 is pivoted at 162 on the associated lever 136 and has a tooth 163 adapted to engage between two adjacent teeth of the dial gear 139. A tension spring 164 extending between the pawl and the lever urges the pawl toward engagement with the gear. However, when the printing levers are in their normal positions illustrated in Fig. 2, a tail on each of the pawls engages a stationary cross bar 165, thus holding the pawls out of engagement with the gears 139. During the printing operation, and when the levers 136 are rocking clockwise, the pawls 161 recede from the rod 165, thus enabling the springs 164 to rock the latter into engagement with their respective gears 139. In order to accelerate the pawling movement of the pawls and to insure engagement thereof with the gears 139, a second stationary rod 166 is located above the tails of these pawls so that as the levers 136 carry the latter upwardly and rearwardly, the tails strike the rod 166 and are positively forced in a counter-clockwise direction toward pawling positions.

Figure 7:
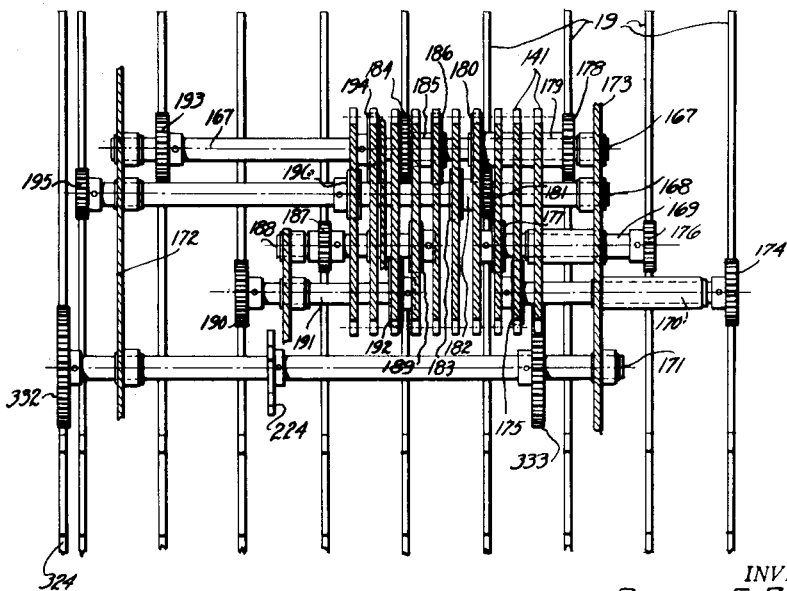
Fig. 7 is a sectional plan view of the condensing arrangement for transmitting a drive from the racks to the printer mechanism and is taken along the line 7—7 of Fig. 2.

Describing now the means for connecting the various idler gears 141 with their associated drive racks 19 in order to register the printing dials in accordance with a value being entered in the accumulator, a series of shafts 167 to 171, inclusive (Figs. 2 and 7) are journaled in frame plates 172, 173, etc., and carry various pinion assemblies which are arranged to entrain the idlers 141 with their respective racks 19. For example, the rack in the #1 or right-hand order of the machine is meshed with a pinion 174 fixed on shaft 170 to which is also fixed a pinion 175 meshing with the #1 idler 141 entrained with the "cents" column numeral printing dial 135. In Fig. 7 this idler is located next to the right hand idler 141. Similarly, the rack in the second order is connected by pinion 176, shaft 169 and pinion 177 to the #2 idler. The rack in the third order is connected by pinion 178, sleeve 179 (rotatably mounted on shaft 167) and pinion 180 to the #3 idler. The rack in the fourth order is connected by a pinion 181, sleeve 182 (rotatably mounted on shaft 168) and pinion 183 to the #4 idler. The rack in the fifth order is connected by pinion 184, sleeve 185 (rotatably mounted on the shaft 167) and pinion 186 to the #5 idler. The rack in the 6th order is connected by a pinion 187, fastened to a shaft 188 (co-axial with shaft 169) and pinion 189 to the #6 idler. The rack in the seventh order is connected by pinion 190, shaft 191 (co-axial with shaft 170) and pinion 192 to the #7 idler. The rack in the eighth order is connected by the pinion 193, shaft 167 and pinion 194 to the #8 idler. The rack in the ninth order is connected by pinion 195, shaft 168 and pinion 196 to the #9 idler.

*Ribbon mechanism*

Referring to Figs. 16 to 19, inclusive, the printing ribbon 144 is of the continuous loop type and may be constructed of cloth, plastic, rubber or the like preferably provided with two differently colored sections so that the factors and results of computations being recorded may be printed in colors appropriate to the type of operation being performed.

The ribbon is guided over four flanged spools 197, 198, 199 and 200, each rotatably mounted on a post carried by a printer frame 201. The frame is supported from the hereinbefore mentioned rod 166 extending across the printer frames 172 and 173 for pivotal movement thereabout. For this purpose, upstanding flanges 202 and 203 are formed on the ribbon frame and have notches therein embracing the rod 166. Torsion springs 203a are fastened to the printer frames 172 and 173 at 204 and extend under the ribbon frame whereby to press the latter upwardly against the rod 166 and also to urge the same clockwise thereabout into engagement with a frame pin 2272.

The spools 197 and 198 are rotatably supported by levers 205 pivoted at 206 to the ribbon frame and urged outwardly by tension springs 207 extending between the tails of the levers and depending ears formed on the ribbon frame, thereby yieldably maintained the ribbon taut.

Means are provided for re-inking or rejuvenating the ribbon 144 as it is moved over the various spools. For this purpose, two reinking chambers 208 (see also Fig. 18) are secured by screws 209 to the ribbon frame on opposite sides of the ribbon loop. Each chamber comprises a pair of isolated sections 208a and 208b filled with fibrous material impregnated with a suitable ink of a color corresponding to the color of the section of the ribbon adjacent thereto. A spindle 210 is rotatably mounted in the side wall of the chamber and has two rolers 211 thereon extending through openings formed in the side walls of the two sections so as to contact the fibrous material within these sections. The ribbon 144 is guided over the outer peripheries of the rollers 211 and thereby receives the ink transmitted from the interior of the sections by the roller.

The ribbon is fed along its loop one increment during each cycle of operation of the machine by a feed pawl 212 (Figs. 16, 17 and 19) which operates against a ratchet 213 fixed to the lower end of the spool 200. Pawl 212 is pivotally supported on a rock lever 214 pivotally mounted on a frame stud 215 and having an elongated slot in the lower end thereof embracing a pin 216 (see also Fig. 28) carried on a key release link 217 to be described hereinafter. A tension spring 218 extends between the pawl 212 and frame stud 215, thus yieldably forcing the pawl into engagement with the ratchet 213 while enabling the latter to rasp over the ratchet during its return stroke.

Means are provided for selecting the particular color section of the ribbon to be used in recording the different types of operation of the machine. Securely keyed to the printer control shaft 137 is an arm 219 having an elongated slot therein embracing a pin 220 carried by a link 221 which is attached to a cam follower bellcrank 222 pivoted on a frame stud 223 and adapted to be adjusted by a control cam 224 fixed on the hereinbefore mentioned shaft 171 (Fig. 7). The shaft 171 forms part of the symbol printing control mechanism as will be described hereinafter, and is rocked to different positions in accordance with the type of operation being performed. Cam 224 has a pair of lobes 225 formed thereon and arranged to rock the bellcrank 222 counter-clockwise against the action of a spring 222' as an incident to adjustment of the machine for certain operations, for example, "non-add" and "sub-total." During the latter operations, therefore, the pin 220 will be positioned toward the open end of the slot in arm 219 as indicated by the dot and dash lines 220' and in such position will underlie a leg 226 extending downward from the ribbon frame 201. During the printing operation, at which time the shaft 137 is rocked clockwise from its position illustrated in Fig. 16, the arm 219 will force pin 220 against the leg 226 whereby to rock the printer frame upwardly against the action of springs 203a and thus position the ribbon 144 in its alternate position indicated by the dot and dash lines 144R. In this position the lower colored section of the ribbon will be arranged to be struck by the printing dials so as to impress on the paper strip carried by the platen 12 the type impressions in that particular color.

However, when the cam 224 is so positioned that neither of the lobes 225 engage the bellcrank 222, the pin 220 will remain in the position illustrated in Fig. 16 and during the upward rocking movement of the arm 219, it will miss the leg 226 so that the upper section of the ribbon 144 will be struck by the printing dials.

It will be noted that the frame 201 is readily removable from the machine by merely depressing the same against the action of springs 203a until the notches in the flanges 202 and 203 are removed from positions embracing the rod 166. Thus the entire ribbon mechanism may be bodily removed as a unit from the machine to permit replacement or servicing and eliminates the troublesome feature found in most machines of this type in the past, namely, that the ribbon must be threaded along its guiding means while such guiding means remains in the machine.

*Clutch controls*

Operation of the machine and engagement of the clutch 57 (Fig. 20) is effected by depression of each of the various control bars except the correction bar 16 (Figs 1, 21 and 24).

Referring to Fig. 20 in particular, the clutch control dog 58 is connected by a pin and slot arrangement 227 to a clutch control bar 228 supported for longitudinal movement by a pair of parallel links 229 pivotally supported on frame pins 230. The bar 228 has four cam slots 231 formed therein, each of which underlies a pin 232 carried on a lever 233 pivoted on a frame pin 234 and urged upwardly by a tension spring 235 extending between the pin 232 and a frame stud 236. The pins 232 underlie the minus, non-add, sub-total and total bar stems 13, 14, 18 and 17, respectively. Therefore, depression of any of these bars will cause the associated pin 232 to cam the clutch control bar 228 forwardly to effect engagement of the clutch 57. It will be noted that a shoulder 237 is located to the rear of each cam slot 231 and when any of the above mentioned bars is depressed, said shoulders will underlie the pins 232 of the remaining control bars, so as to prevent depression thereof until the depressed bar has been released.

Although the clutch 57 may be of any well known construction it is preferable to form one element of the driven side thereof as a disc such as indicated at 448 having the major portion of the contour thereof concentric with shaft 51 and underlying the control dog 58 whereby to hold the control bar 228 forward against the action of a spring 228a and consequently hold a depressed pin 232 in an active lowermost position during a major portion of an instant cycle.

Provision is also made to effect engagement of the clutch upon depression of either of the add bars 10 and 11 and the repeat bar 15. Referring to Fig. 24, bellcranks 238 and 239 are pivoted on frame pins 240 adjacent the add bar 11 and repeat bar 15, respectively. Pins 241 mounted on the bellcranks 238 and 239 underlie the stems of the associated bars. A pin 242 carried at the upper end of bellcrank 239 fits within a slot formed in a control link 243 pivoted to an arm 244 which is attached to a shaft 245 pivotally mounted in flanges 246 (Fig. 2), extending upward from the brackets 47.

The manner in which arm 244 is attached to shaft 245 is shown in detail in Figs. 24 and 25. It will be noted that the arm has an open ended slot 440 therein which is slipped over two parallel slots 441 formed in the shaft 245. A screw 442 is passed through ears 443 formed on the arm directly over the slot, the screw being threaded in the lower ear to clamp the arm firmly onto the shaft. Also, the screw 442 is located directly in front of the shaft to prevent the arm from slipping off the shaft.

Arms 247 attached to the shaft 245 carry a rod 248 which extends over a camming contour 249 (Fig. 20) formed on the control bar 228. Upon depression of the repeat bar 15, its bellcrank 239 will be rocked counter-clockwise against the action of a spring 251 tensioned between the pin 242 and a frame pin 252 thereby forcing the link 243 forward to lower the rod 248 and thereby cam the clutch control bar 228 forward.

The bellcrank 238 (Fig. 24) also has a pin 253 thereon overlying a shoulder 254 on the link 243, so that depression of the add bar 11 will rock the bellcrank 238 against the action of a spring 255 and likewise force the link 243 forwardly.

It will be noted on reference to Fig. 2 that the stems 50 of the add bar 10 are provided with slots surrounding the rod 248 so that the depression of this bar will likewise effect forward movement of the clutch control bar 228 to engage the clutch.

Operation of the clutch dog 58 also causes closing of a normally open motor switch generally indicated at 385 (Fig. 20). A switch operating lever 386 is pivoted on a frame pin 387 and overlies an ear 388 on the clutch dog 58 so that counter-clockwise rocking of the latter to engage the clutch will rock the lever 386 against the action of a spring 389 tensioned between the lever and a frame pin 390 to permit a switch plunger 391 to be spring operated downwardly in a manner not shown to close the motor switch.

From the above it will be noted that the arrangement of the aforementioned controls enables the repeat bar to cause repeated subtractive or non-add operations as well as additive operations. The former is effected by depressing the repeat bar simultaneously with either the minus bar 13 or non-add bar 14. Depression of either bar will force the pin 232 underlying the stem thereof into the diagonal slot 231 (Fig. 20) of the clutch control bar, forcing the latter into clutch engaging position. At the same time, depression of the repeat bar will force the camming rod 248 to move down into a holding position behind the cam portion 249 of the clutch control bar. Thus, the aforementioned pin 232 will be maintained in its lowermost position as long as the repeat bar is held down even though the corresponding minus or non-add bar is allowed to raise in the meantime and the depressed pin 232 will, as mentioned before, effect the appropriate type of operation.

*Accumulator controls*

As also stated under the heading Accumulator, the accumulator is raised or lowered to mesh the accumulator gears 85 (Fig. 2) with either the upper rack gear sections 83 or the lower rack gear sections 84 of the drive racks 19 depending upon the type of operation to be performed. For this purpose, mechanism is provided which is under the control of the different control bars for determining and effecting the positioning of the accumulator.

The hereinbefore described box cam 94 (Fig. 22) carries a pair of pins 257 and 258 arranged on opposite sides of the frame pin 95. These pins are adapted to be selectively engaged by a hook member 259 connected to a three-armed cam follower 260 pivoted on the shaft 81. The cam follower is urged counter-clockwise by a spring 261 tensioned between one arm of the cam follower and a frame pin 262 to press a roller 263 on another arm thereof against a cam 264 keyed on the drive shaft 51. Cam 264 has a high portion extending over substantially half of its periphery whereby to rock the cam follower 260 and thereby position the hook member 259 rearward during approximately the first half of a machine cycle. Normally, during additive operations or when the machine is at rest, the hook member 259 is raised by a tension spring 265, whereby a slot 266 therein embraces the upper pin 257, so that as the hook is moved rearward it will rock the cam 94 clockwise to lower the accumulator into its additive position.

For the purpose of locating the hook member 259 in a lowermost or an intermediate position, a control bar 267 is provided, being supported for longitudinal movement by a pair of parallel links 268 pivotally supported by frame pins 269. The bar 267 has four camming surfaces 270 formed thereon and underlying the various aforementioned pins 232 operable by the different control bars on the left-hand side of the machine. The bar 267 is connected by a pin and slot arrangement 271 to a bellcrank 272 pivoted on a frame stud 273 and having a pin 274 on the opposite end thereof which is embraced by a slot formed in the hook member 259.

The camming surfaces 270 of bar 267 are so arranged that upon depression of the minus bar 13, the total bar 17 or the sub-total bar 18 the control bar 267 will be moved forwardly its fullest extent which, through the bellcrank 272, will lower the hook member 259 until a slot 275 therein embraces the pin 258 so that subsequent rearward movement of the hook member will place the accumulator into its upper substractive position. The contour of the camming surface 270 underlying the non-add bar 14 is such that depression of this bar will move the control bar 267 only part way through its stroke so that the hook member 259 will be located in an intermediate position in which neither slot 266 nor 275 will embrace its associated pin on the cam 94 and consequently will not effect rocking of the cam 94 during operation of the machine.

During an additive or subtractive operation and after the high portion of cam 264 has passed the roller 263, the spring 261 will become effective to return hook 259 and cam 94 to their positions illustrated in Fig. 22.

In order to maintain the box cam 94 in its neutral position illustrated in Fig. 22 when it is so positioned, a centralizer lever 276 is provided, being pivoted on a frame stud 277 and urged in a clockwise direction by a tension spring 278 to force a roller carried thereby into a detent 279 formed in the under-surface of the box cam 94.

In totaling operations, the accumulator is returned to zero during the first part of the operating cycle and is then placed in a neutral position in the same manner as normal addition and subtraction operations, while in sub-totaling operations, the accumulator is returned to zero during the first part of the cycle and is then again reset at its former accumulated value during the latter part of the cycle. Therefore, it is necessary in the latter operation to maintain the accumulator in mesh with the drive racks 19 until the latter have returned from their forward strokes. To this end, a second cam 1279 is mounted on the shaft 51 adjacent the cam 264 and is provided with a high portion extending around the major portion of the periphery thereof. This cam engages the roller 280 (Fig. 23) of a second bellcrank 281 also pivoted on the shaft 81. A slot 282 is formed in the rearwardly extending arm of bellcrank 281 which is co-extensive with a slot 283 formed in the cam follower 260. However it will be noted that the rearward extension of the bellcrank 281 is somewhat shorter than the similar extension of the cam follower 260.

A pin 284 carried by a link 285 rides within one or both of the slots 282 and 283 depending on its position longitudinally of the machine. The link 285 is connected to the lower arm of the lever 233 which is associated with the sub-total bar 18 and is so arranged that when the bar 18 is in a raised position as indicated in Fig. 22 the pin 284 will be located solely in the slot 283 of cam follower 260. However, upon depression of the bar 18 as indicated in Fig. 23, the pin 284 will be moved forwardly to locate within both the slot 283 and the slot 282. In this condition, i. e. during a sub-totaling operation, the two members 260 and 281 will move as a unit and the cam 1279 will therefore, through the hook member 259, hold the accumulator engaged with the drive racks throughout the major portion of the cycle, as indicated in Fig. 31.

During totaling and sub-totaling operations the keyboard is not utilized to control the extent of movement of the racks 19 but instead the racks are controlled by the various accumulator gears in returning from their accumulated increments of rotation to their starting or zero positions.

Referring to Fig. 10, a series of ordinally spaced zero stop levers 286 are keyed to the shaft 87 adjacent the various gears 85 and are (during totaling and sub-totaling operations) rocked by the shaft 87 into blocking positions indicated by dot and dash lines 286a relative to zero locating pins 287 carried by the transfer teeth 101. Thus, when the gears 85 are rotated counter-clockwise by the drive racks 19 they will return to zero positions at which time they are blocked by levers 286 thereby breaking the connections between the drive racks and rack drive mechanism hereinbefore described.

The shaft 87 and zero stop levers 286 are rocked by power under control of the bars 17 and 18, and in order to accomplish this an arm 288 (Figs. 22 and 23) is keyed to the shaft 87 and is connected through a pin and slot connection 289 to a floating lever 290 which rides on the stationary frame pin 277. The forward end of lever 290 is pivoted to the lower end of a link 292, the upper end of which is pivotally connected to a cross link 293 intermediate its ends. The link 293 is pivotally connected to the pins 232 underlying the stems of the bars 17 and 18. Upon depression of either of the bars the link 292 will be lowered sufficiently to rock the lever 290 counter-clockwise about the pin 277 to position a hook 294 thereon in the path of a pin 295 carried by the cam follower 281 so that as the latter is rocked at the beginning of a total or sub-total operation the pin 295 will drive the lever 290 forwardly, rocking the shaft 87 against the action of a spring 291 to likewise rock levers 286 into blocking position. Thus, as the machine continues its cycle the racks will be driven forward, rotating the accumulator gears 86 in a substractive direction until they are stopped in their zero position by the levers 286. The racks will therefore stand in positions mechanically representing the value previously registered by the accumulator and will consequently cause the printer dials to register this value.

*Platen feed*

The paper strip or tape on which the factors and results of computations are printed is fed at certain increments past the printing position or point by the platen 12.

In order to insure intimate driving contact between the paper and the platen a guide member 296 (Figs. 2 and 3) is provided having the upper surface thereof conforming substantially to the contour of the platen. The member 296 is pivotally supported at 298 in a suitable manner (not shown) to the printer frame plates and it is urged clockwise toward the platen by a spring 299 tensioned between the member and a suitable portion of the frame, so as to impress a roller 297 carried by the member 296 against the paper strip. A pair of fingers 300 extend upwardly from the member 296 on either side of the group of printing dials 135 to aid in guiding the strip upwardly.

The paper is carried in a roll (not shown) located in the rear of the machine and arranged to guide the paper onto the platen 12.

A stationary paper cut-off bar 301 extends across the upper tips of the fingers 300 for the purpose of severing the paper strip which is passed thereunder.

Figure 27:
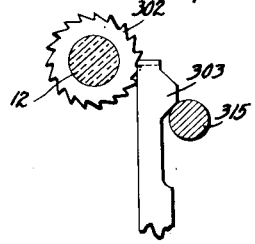
Fig. 27 is a fragmentary side view illustrating the platen ratchet feed pawl at the end of its stroke.
Figure 26:
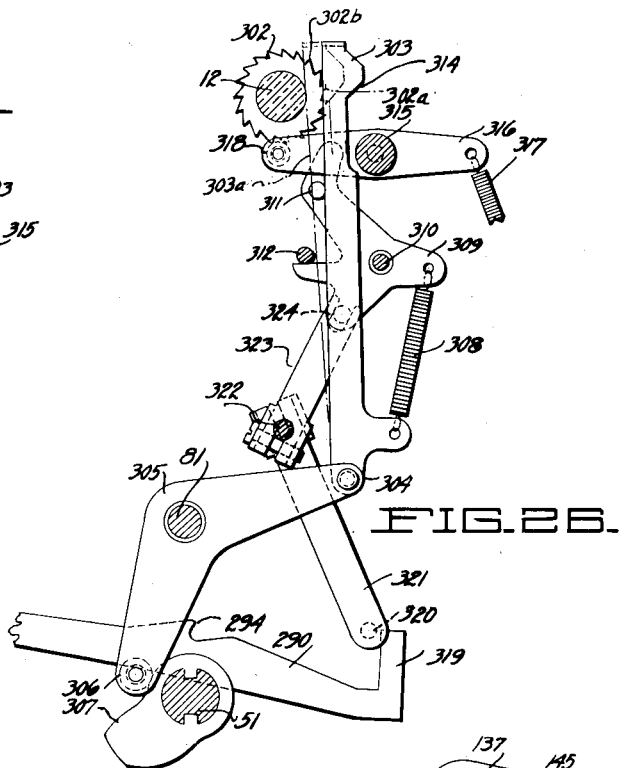
Fig. 26 is a side view of the platen feeding mechanism.

The platen 12 is normally rotated one increment after each printing operation but when taking totals or sub-totals it is rotated three increments so as to space these values from the rest of the entered items. For this purpose, a ratchet 302 (Fig. 26) is attached to the platen and is fed by the upper ear of a pawl 303 pivotally connected at 304 to a cam follower 305 pivoted on the shaft 81. The lower end of the cam follower carries a roller 306 engaging a cam 307 keyed on the shaft 51. The pawl 303 is urged to the left by tension spring 308 extending between the pawl and a control lever 309 which is pivoted on a frame stud 310. A pin 311, also mounted on the control lever 309, presses against the side of the pawl 303. The leverage ratios involved between the spring 308, the pawl 303 and the lever 309 is so arranged that the pin 311 will normally press the pawl rearward into the position illustrated in Fig. 26, this outward movement being limited by a frame stud 312 against which the lever 309 normally rests. During operations other than totaling and sub-totaling the pawl 303 will be moved downwardly by the cam 307 against the action of spring 308 while riding against the pin 311 until it strikes a ratchet tooth in the position indicated at 302a. Further downward movement will rotate the ratchet one tooth before the pawl reaches the end of its stroke. At this time, a diagonal shoulder 314 will strike a frame pin 315 thereby wedging the ear of the pawl against the ratchet 302 as illustrated in Fig. 27 to prevent overthrow of the ratchet and platen.

A centralizer arm 316 is pivoted on the frame pin 315 and is urged clockwise by a spring 317 to press a roller 318 on the opposite end thereof against the teeth of the ratchet.

In the event that the total or sub-total key is depressed the floating lever 290 will be rocked counter-clockwise as described hereinbefore so that a hook 319 formed thereon will be positioned behind a pin 320 on an arm 321 fastened to a rock shaft 322. During the subsequent machine operation the lever 290 will be moved forwardly and the hook 319 will rock arm 321 and shaft 322 in a clockwise direction. A second arm 323 also attached to shaft 322 is connected by a pin and slot connection 324 to the control lever 309 and, therefore, the latter will be rocked counter-clockwise moving the pin 311 forwardly whereby the spring 308 will become effective to position the pawl 303 forwardly in the location indicated by the dot and dash lines 303a. Consequently, during the subsequent stroke of the pawl 303 it will engage a ratchet tooth indicated at 302b resulting in a three tooth advance of the platen. In the latter case, the shoulder 314 will also be effective to prevent overthrow of the platen at the end of the stroke.

In order to manually advance the platen 12 as when feeding a new paper strip through the machine and into printing position a serrated knob 12a (Fig. 1) is attached to the platen and extends through an opening 12b in the cover 361 of the machine where it may be manually rotated in either direction.

The cut-off bar 301 is so located that after an additive or subtractive value has been printed the paper strip will be advanced by the platen to a position wherein the printed numerals lie directly below the cut-off bar. However, after a total or sub-total operation the paper will be advanced to such an extent that the printed numerals of such total or sub-total values will lie directly above the cut-off bar.

Symbol printing controls

In order to indicate on the paper strip the type of factor or value printed, an appropriate symbol is printed along the side of each value which is the result of a total, sub-total, non-add, or minus operation.

Referring to Fig. 20, a symbol control rack 324 is provided having two elongated slots 325 and 326, the former being guided over a frame stud 327, while the latter embraces the shaft 81. A spring 328 is tensioned between a frame stud 329 and the rack 324 to yieldably press the rack against the rack drive shaft 70. A series of four shoulders 330 are formed along the rack and each is adapted to engage a control bar actuated pin 232 upon depression thereof by its respective control bar. The shoulders 330 are spaced apart distances slightly greater than the distances between the pin 232 so as to enable a forward movement of the rack 324 an amount depending upon the particular key depressed. A rack gear section 331 is formed on rack 324 and meshes with a gear 332 carried by a shaft 171 (Figs. 2 and 7) to which the cam 224 and a second gear 333 is also fastened.

The gear 333 meshes with the right-hand idler 141 which is entrained with an associated symbol printing dial 135 located at the right of the various numeral printing dials 135. In all respects, the symbol printing dial is operated in a manner similar to that of the various numeral printing dials except that it has formed thereon symbol type appropriate to the type of operation being performed.

Means are provided for preventing the rack from advancing when an addition operation is being performed, it being desired not to print a symbol during such addition operation. For this purpose, a latch 334 (Fig. 20) is pivoted on a frame pin 335 and is allowed to normally rest behind pin 336 carried by the rack 324. A pin 337 (see also Fig. 22) is carried by the latch 334 and fits within a slot formed in the accumulator positioning control bar 267. Therefore, since the bar 267 is not actuated during an addition operation, the latch 334 will remain in latching position during such operation and will prevent substantial forward movement of the symbol rack at that time. However, during a subtraction, non-add, total or sub-total operation the bar 267 will be actuated and the latch 334 will consequently be raised to permit the rack 324 to follow the rack drive shaft 70 until stopped by the depressed pin 232.

Key release controls

In normal addition and subtraction operations the amount keys 9 are automatically released near the end of each machine cycle, while in a repeat operation the keys are allowed to remain in their set positions throughout the number of repeated cycles during which the repeat bar 15 is held depressed. To accomplish this, a cam 338 (Fig. 28) is keyed on the shaft 51 and actuates a roller 339 on a cam follower 340 pivoted on the shaft 81 and urged counterclockwise by a tension spring 340'. Cam follower 340 is connected to the previously mentioned key release link 217 which is urged upwardly by a spring 341 tensioned between the cam follower 340 and the link, thereby holding the forward end thereof against the pin 241 (see also Fig. 24). When the repeat bar 15 is in its raised position as illustrated in Fig. 28 a pin 342 on the link 217 lies directly in front of a key release lever 343 pivoted on a frame pin 344 and having an arm thereon underlying a bellcrank 345 (Fig. 4) which is pivoted at 346 to the rear wall of the key frame 21. A key release bar 347 is pivotally connected at one end to the ballcrank 345 and at its opposite end to a second bellcrank 348 also pivoted at 349 to the rear wall of the key frame. A series of shoulders 350 are formed on the bar 347, each of which lies in front of one of the key release bails 38. Therefore, during operation of the machine under the above conditions the lever 343 will be actuated by pin 342 to rock bellcrank 345 causing the release bar 347 to rock all of the bails 38 and release all depressed amount keys 9.

In repeat operations, depression of the repeat bar 15 will cause the associated pin 241 to lower the forward end of link 217 so as to locate its pin 342 below the lever 343, so that the subsequent operation of the machine will result in an idle traverse of the pin 342.

In order to prevent the repeat bar 15 from being allowed to be raised before the end of any one cycle in the event the operator removes his finger from said key before the cycle is completed, a latch 351 is provided, being pivoted at 352 to the machine frame and urged forwardly by a tension spring 353. A latching shoulder 354 is formed on the latch and is adapted to latch the pin 241 in its lowermost position. At the end of every cycle a pin 355 on the link 217 strikes the latch 351, thus unlatching the pin 241, and if it is not otherwise held depressed by the operator pressing on the bar 15 it will be forced upward by spring 251 (Fig. 24) to raise the repeat bar and permit the spring 341 to raise the key release link. This releasing action will occur after the pin 342 has passed below the lever 343 and, therefore, the amount keys will not be released at this time.

In totaling and sub-totaling operations the amount keys must be released in advance of the forward movement of the drive racks 19. For this purpose, the total and sub-total bars cause release of the keyboard before the clutch is engaged. Referring to Fig. 21, a cam lever 356 is pivoted on a frame pin 357 and has two depending legs forming cam surfaces which underlie the pins 232 associated with the stems of the total and sub-total bars. Depression of either of these bars will cause counter-clockwise rocking of the lever 356, forcing an arm thereof against the bellcrank 348 (Fig. 4) to release the keyboard.

Means are also provided for causing the correction key 16 to release the keyboard without effecting a machine operation. As shown in Fig. 28 the above mentioned key release lever 343 has a camming surface 358 underlying the pin 241' associated with the correction key. The pin 241' is carried by a lever 450 pivoted on a frame pin 451 and urged upward by a spring 1241 extending between the pin and the frame pin 252. Thus, depression of the bar 16 will rock lever 343 to cause release of the keyboard.

*Cover*

The cover encasing the machine is insulated from the machine frame by rubber or suitable material so as to reduce the transmission of noise and vibration to the exterior of the machine.

Referring to Figs. 29 and 30 it will be noted that the cover is in two sections, a lower section 360 and an upper section 361.

The lower section 360 has a series of holes therein, in which are fitted grommets 362 of rubber or the like. A clamp screw 363 passes through each of the grommets and is secured to one of two cross pieces 364 and 365 forming part of the machine frame.

Feet 366 extend through openings in the bottom cover 360 as shown in Fig. 2 and support the cross bars 364 and 365 by rubber pillars 367.

The upper cover 361 is resiliently supported from the machine frame plates 23 and 24 and is arranged to be readily removed to gain access to the interior of the machine for the purpose of replacing the ribbon and servicing the mechanism. A series of four pins 368 located adjacent the four corners of the machine extend downwardly from the upper cover and fit within rubber or the like grommets 369 carried by brackets 370 and 371 on each side of the machine, suitably attached to the machine frame plates 23 and 24. The cover 361 is removably attached to the lower cover 360 by a pair of lock members 372 on opposite sides of the machine. Each of these members is slidably attached by means of a guide stud 373 to the flange 374 on the bottom cover, being slidable along a groove 373' formed therein. The lock member is provided with a knob 375 extending downwardly through an elongated slot in the flange to permit manual adjustment of the lock to and from its locking position illustrated in Fig. 29. The lock member has an elevated rear section 376 adapted to be inserted in a slot 377 formed in a rib 378 integral with the cover 361, and when the lock is adjusted rearwardly, said section 376 fits over the surface forming the bottom of the slot 377 to retain the upper cover. When the lock is adjusted forwardly, the section 376 is removed from the slot thereby permitting ready removal of the cover.

In order to obtain maximum visibility of the values recorded on the paper strip and also to effectively cover the operating parts of the machine, particularly the printing mechanism, a movable cover section 455 (Figs. 1, 2 and 3) is provided, being pivoted by trunnions 456 to the upper cover and extending over the printer mechanism to a point adjacent the platen 12. The section 455 is urged downward into the position shown in Fig. 2 partly by its own weight and partly by a spring 457 extending between projections on the section and on the upper cover 361. An arm 458 attached to the section 455 extends downward and has a cam surface on the lower edge thereof contacting a roller 459 carried by an arm 460 secured to the printer control shaft 137.

Normally, except during a printing operation, the section 455 lies in the position illustrated in Fig. 2, the rearmost edge of the section being positioned directly below the location of the printed numerals on the paper tape when such numerals are recorded as the results of any operation but a total or sub-total operation. Therefore, it will be seen that the cover section aids in leading the operator's eyes directly to the last printed item, except total or sub-total records. Also, the cover section and the cut-off bar 301 frame the said printed numerals so that the last recorded value may be quickly found by the operator.

During a printing operation, the shaft 137, when rocked to allow the printer arms 136 to rock rearward, will cause arm 460 to force arm 458 and cover section 455 upwardly sufficiently to allow the printer dials 135 to pass thereunder as illustrated in Fig. 3.

Having thus described the invention, what I desire to secure by United States Letters Patent is:

1. In a calculating machine, the combination with reversible accumulator elements, and drive racks therefor adapted to drive said elements in one or the other of opposite directions, of means including an accumulator positioning member settable into any one of three positions for selectively adjusting said racks and accumulator elements to permit driving of said accumulator elements in an additive direction, a subtractive direction or in a drive-preventing position, respectively, a selector device operable to actuate said accumulator positioning member to any one of said positions, means for actuating said selector device to position said accumulator positioning member to permit driving of said accumulators in said additive direction, means for actuating said selector device to position said accumulator positioning member to permit driving of said accumulators in said subtractive direction, means for actuating said selector device to position said accumulator positioning member in said accumulator drive-preventing position, power means for operating said selector device in a predetermined manner whereby to actuate said accumulator positioning member, mechanism for rendering said power means effective, a second power means for operating said selector device in a different predetermined manner whereby to actuate said accumulator positioning member, and means for selectively rendering said second power means effective.

2. In a calculating machine, an accumulator positioning member, means pivotally supporting said accumulator positioning member, a pair of spaced projections carried by said accumulator positioning member and disposed on opposite sides of said pivotal supporting means, a selector member for actuating said accumulator positioning member, means connected with said selector member for reciprocating said selector member, said selector member having a portion of less width than the space between said projections, said portion having a pair of inwardly extending notches arranged for selective engagement with one or the other of said pair of projections, said selector member having an intermediate position in which it is reciprocable relative to said accumulator positioning member with neither notch engaging one of said projections, spring means for normally positioning said selector member so that one of said notches is engaged with one of said projections, and key mechanism including a single differentially settable element, said element being settable into one position for positioning said selector member so that the other of said notches is engaged with the other of said projections, said element being settable into a second position for positioning said selector member so that neither of said notches is engaged with one of said projections.

3. In a calculating machine, an accumulator positioning member, means pivotally supporting said accumulator positioning member, a pair of spaced projections carried by said accumulator positioning member and disposed on opposite sides of said pivotal supporting means, a selector member for actuating said accumulator positioning member, means connected with said selector member for reciprocating said selector member, said selector member having a portion of less width than the space between said projections, said portion having a pair of inwardly extending notches arranged for selective engagement with one or the other of said pair of projections, said selector member having an intermediate position in which it is reciprocable relative to said accumulator positioning member with neither notch engaging one of said projections, means for positioning said selector member so that one of said notches is engaged with one of said projections, means for positioning said selector member so that the other of said notches is engaged with the other of said projections, and means for positioning said selector member in said intermediate position so that neither of said notches is engaged with one of said projections.

4. In a calculating machine, an accumulator positioning member, means pivotally supporting said accumulator positioning member, a pair of spaced projections carried by said accumulator positioning member disposed on opposite sides of said pivotal supporting means, a selector member for actuating said accumulator positioning member, means connected with said selector member for reciprocating said selector member, said selector member having a portion of less width than the space between said projections, said portion having a pair of inwardly extending notches arranged for selective engagement with one or the other of said pair of projections, said selector member having an intermediate position in which it is reciprocable relative to said accumulator positioning member with neither notch engaging one of said projections, and means for positioning said selector member including a differential cam bar operatively connected with said selector member, and key means for actuating said differential cam bar.

5. In a calculating machine, an accumulator positioning member, means pivotally supporting said accumulator positioning member, a pair of spaced projections carried by said accumulator positioning member disposed on opposite sides of said pivotal supporting means, a selector member for actuating said accumulator positioning member, means connected with said selector member for reciprocating said selector member, said selector member having a portion of less width than the space between said projections, said portion having a pair of inwardly extending notches arranged for selective engagement with one or the other of said pair of projections, said selector member having an intermediate position in which it is reciprocable relative to said accumulator positioning member with neither notch engaging one of said projections, means normally positioning said selector member so that one of said notches is engaged with one of said projections, means comprising a differentially settable cam bar operatively connected with said selector member and settable into one position for selectively positioning said selector member so that the other of said notches is engaged with the other of said projections, said cam bar being settable into a second position for positioning said selector member so that neither of said notches is engaged with one of said projections, means comprising a depressible key for camming said cam bar into said one position thereof, and means comprising a second depressible key for camming said cam bar into said second position thereof.

6. In a calculating machine, the combination with reversible accumulator elements, and drive racks therefor adapted to drive said elements in one or the other of opposite directions: an accumulator positioning device for positioning said accumulator elements relative to said drive racks to be driven thereby, said accumulator positioning device being settable into any one of three positions for selectively and relatively adjusting said racks and accumulator elements to permit driving of said accumulator elements in an additive direction, a subtractive direction or in a drive-preventing position, respectively, means pivotally supporting said accumulator positioning device for movement into any one of said positions, a pair of spaced projections carried by said accumulator positioning device and disposed on opposite sides of said pivotal supporting means, a selector member for actuating said accumulator positioning device, means for reciprocating said selector member, said selector member having shoulders engageable with said projections when said selector member is moved in one direction for positioning said accumulator positioning device in said drive-preventing position, said selector member also having an extension of a width less than the spacing between said projections extending beyond said shoulders and provided with inwardly extending notches, one adjacent each of said shoulders for selective engagement with said projections, to cause said accumulator positioning device to be rotated in one direction or the other about said pivotal supporting means depending upon which of said notches is engaged with one of said projections to selectively position said accumulator elements to permit driving thereof in one direction or the opposite direction when said selector member is moved in the opposite direction, said selector member having an intermediate position in which neither of said notches engages said projections so that said selector member can be moved in said opposite direction without actuating said accumulator positioning device, and means for positioning said selector member so that either or neither of said notches is engaged with a projection.

7. In a calculating machine, the combination with reversible accumulator elements, and drive racks therefor adapted to drive said elements in one or the other of opposite directions, of means including an accumulator positioning member settable into any one of three positions for selectively and relatively adjusting said racks and accumulator elements to permit driving of said accumulator elements in an additive direction, a subtractive direction or in a drive-preventing position, respectively, means operable to actuate said accumulator positioning member to any one of said positions, drive mechanism for operating said actuating means in a predetermined manner whereby to set said member, means for rendering said drive mechanism effective, a second drive mechanism for operating said actuating means in a different predetermined manner whereby to set said member, and means for selectively rendering said second drive mechanism effective.

8. In a calculating machine, the combination with reversible accumulator elements, and drive racks therefor adapted to drive said elements in one or the other of opposite directions, of means including an accumulator positioning member settable into any one of three positions for selectively and relatively adjusting said racks and accumulator elements to permit driving of said accumulator elements in an additive direction, a subtractive direction or in a drive-preventing position, respectively, means operable to actuate said accumulator positioning member to any one of said positions, drive mechanism comprising a cam and cam follower for normally operating said actuating means in a predetermined manner whereby to set said member, a second drive mechanism comprising a second cam and cam follower for operating said actuating means in a different predetermined manner whereby to set said member, and means for selectively rendering said second drive mechanism effective or ineffective to operate said actuating means.

ROBERT E. BOYDEN.

REFERENCES CITED

The following references are of record in the file of this patent:

UNITED STATES PATENTS

| Number | Name | Date |
|---|---|---|
| 1,206,878 | Martin | Dec. 5, 1916 |
| 1,253,367 | Fuller | Jan. 15, 1918 |
| 1,357,423 | Robb | Nov. 2, 1920 |
| 1,705,272 | Sundstrand | Mar. 12, 1929 |
| 1,801,484 | Bricken | Apr. 21, 1931 |
| 1,853,051 | Horton | Apr. 12, 1932 |
| 1,900,808 | Haase | Mar. 7, 1933 |
| 1,901,152 | Dunker | Mar. 14, 1933 |
| 1,965,611 | Sundstrand | July 10, 1934 |
| 2,055,023 | Authier | Sept. 22, 1936 |
| 2,120,936 | Kohnle | June 14, 1938 |
| 2,122,518 | Deane et al. | July 5, 1938 |
| 2,124,177 | Lasker et al. | July 19, 1938 |
| 2,140,136 | Lasker | Dec. 13, 1938 |
| 2,141,119 | Wheeler, Jr., et al. | Dec. 20, 1938 |
| 2,165,923 | Garbell | July 11, 1939 |
| 2,194,270 | Sundstrand | Mar. 19, 1940 |
| 2,261,115 | Hofgaard | Nov. 4, 1941 |
| 2,264,582 | Petit | Dec. 2, 1941 |
| 2,278,405 | Niemann | Mar. 31, 1942 |
| 2,297,541 | Dugdale | Sept. 29, 1942 |
| 2,355,637 | Faigle | Aug. 15, 1944 |
| 2,360,005 | Mehan | Oct. 10, 1944 |
| 2,363,811 | Shearston | Nov. 28, 1944 |
| 2,367,421 | Muller | Jan. 16, 1945 |
| 2,391,089 | Frichen et al. | Dec. 18, 1945 |